United States Patent
Katoh et al.

(10) Patent No.: US 7,480,090 B2
(45) Date of Patent: Jan. 20, 2009

(54) OPTICAL DEFLECTING DEVICE, OPTICAL DEFLECTING DEVICE ARRAY, METHOD FOR DRIVING THE OPTICAL DEFLECTING DEVICE AND IMAGE PROJECTION DISPLAY APPARATUS USING THE DEVICE

(75) Inventors: Seiichi Katoh, Sendai (JP); Takeshi Nanjyo, Takarazuka (JP); Koichi Ohtaka, Shibata-gun (JP)

(73) Assignee: Ricoh Company, Ltd., Tokyo (JP)

( * ) Notice: Subject to any disclaimer, the term of this patent is extended or adjusted under 35 U.S.C. 154(b) by 48 days.

(21) Appl. No.: 11/582,995

(22) Filed: Oct. 19, 2006

(65) Prior Publication Data

US 2007/0091416 A1 Apr. 26, 2007

(30) Foreign Application Priority Data

Oct. 20, 2005 (JP) ............................. 2005-305746
Oct. 4, 2006 (JP) ............................. 2006-273232

(51) Int. Cl.
*G02B 26/00* (2006.01)
*G02B 26/08* (2006.01)

(52) U.S. Cl. ...................................... 359/290; 359/198
(58) Field of Classification Search ................ 359/198, 359/225, 290, 295, 298, 872
See application file for complete search history.

(56) References Cited

U.S. PATENT DOCUMENTS

| 6,431,714 | B1 * | 8/2002 | Sawada et al. ............... 359/879 |
| 6,908,199 | B2 * | 6/2005 | Cha .............................. 353/98 |
| 7,064,878 | B2 | 6/2006 | Nanjyo et al. |
| 7,099,060 | B2 | 8/2006 | Nanjyo et al. |
| 2006/0103912 | A1 | 5/2006 | Katoh et al. |
| 2006/0104597 | A1 | 5/2006 | Nanjo et al. |
| 2006/0109539 | A1 | 5/2006 | Katoh et al. |
| 2007/0091416 | A1 | 4/2007 | Katoh et al. |

FOREIGN PATENT DOCUMENTS

| JP | 9-230257 | 9/1997 |
| JP | 2002-525676 | 8/2002 |
| JP | 3411014 | 3/2003 |
| JP | 3492400 | 11/2003 |
| JP | 2004-78136 | 3/2004 |
| JP | 2004-138881 | 5/2004 |
| WO | WO 00/17695 | 3/2000 |

OTHER PUBLICATIONS

U.S. Appl. No. 11/776,305, filed Jul. 11, 2007, Nanjyo et al.
U.S. Appl. No. 12/014,570, filed Jan. 15, 2008, Nanjyo et al.

* cited by examiner

*Primary Examiner*—William C Choi
(74) *Attorney, Agent, or Firm*—Oblon, Spivak, McClelland, Maier & Neustadt, P.C.

(57) ABSTRACT

An optical deflecting device includes a plate-like member having a light reflective area and a conductor layer. The plate-like member rotates with substantially the middle portion thereof made a fulcrum to change an inclination direction thereof and thereby a reflection direction of a light flux incident to the light reflective area is changed. A first electrode group and a second electrode group are arranged so as to oppose the conductor layer of the plate-like member, respectively, and to sandwich a position corresponding to a position of the fulcrum of the plate-like member. Each electrode group includes a control electrode controlling starting of the plate-like member and a drive electrode driving the plate-like member.

6 Claims, 13 Drawing Sheets

STATE 1

(1-a)

(1-b)

STATE 2

(2-a)

(2-b)

(2-c)

(2-d)

STATE 3

(3-a)

(3-b)

(3-c)

(3-d)

OPTICAL DEFLECTING DEVICE, OPTICAL DEFLECTING DEVICE ARRAY, METHOD FOR DRIVING THE OPTICAL DEFLECTING DEVICE AND IMAGE PROJECTION DISPLAY APPARATUS USING THE DEVICE

CROSS-REFERENCE TO RELATED APPLICATIONS

The present application claims priority and contains subject matter related to Japanese Patent Applications No. 2005-305746 and No. 2006-273232 filed in the Japanese Patent Office on Oct. 20, 2005 and Oct. 4, 2006, respectively, and the entire contents of which are hereby incorporated herein by reference.

BACKGROUND OF THE INVENTION

1. Field of the Invention

The present invention generally relates to an optical deflecting device changing a reflection direction of an incident light flux, and a method for driving the optical deflecting device, and for example relates to a technology suitable for use in an image forming apparatus of electrophotography, such as a printer, a copier, etc., and a projection-type image and video display apparatus, such as a projector, a digital theater system, etc.

2. Discussion of the Background

A digital micromirror device using a torsion-beam hinge has been proposed by L. J. Hornbeck (see "1989 Proc. SPIE Vol. 1150, pp 86-102"), and a space optical modulation device having a micromirror group, evolved from the technology of the digital micromirror device called a DMD (Digital Micromirror Device), is used in an image projection apparatus (see "1998 Proc. of the IEEE, vol. 86, No. 8, pp 1687-1704").

In these devices, generally, a mirror is supported with a torsion beam called a hinge, and the reflective area of the mirror is decreased because of using the hinge. However, in the above-described DMD, a reflection member is provided to a surface of the mirror separately from a hinge part, in a bi-level structure. Further, although the actual drive voltage becomes a several dozen volt because of using the hinge, to control the data for switching the inclination direction of the mirror with about 5-7.5V, switching of the inclination direction of the mirror is performed by combining a biasing voltage of several dozen volt, which is added to a plurality of DMDs, each constituting a pixel, all at one time, and a restoring force of a special spring member.

Further, an optical deflecting device in which a plate-like member having a light reflective area does not have a fixed end such as a hinge has been proposed, for example, in Japanese Patent Application Laid-open Publication No. 2004-078136. The plate-like member is slantingly placed on a fulcrum member provided on a substrate, without fixing the plate-like member on the substrate, and the plate-like member is rotated with the fulcrum member made a fulcrum to change the inclination direction of the plate-like member by applying potentials to electrodes arranged around the fulcrum member on the substrate to oppose the plate-like member and thereby a light flux incident to the light reflective area of the plate-like member is reflected with its reflection direction changed. Regulation members provided with cowl-like stoppers at respective upper parts thereof are arranged at corners of the substrate to regulate rotation of the plate-like member.

In an optical deflecting device using a hinge for supporting a plate-like member, a restoration force due to stiffness of the hinge exists, so that the drive voltage becomes relatively high, for example, to a several dozen volt. On the other hand, the optical deflecting device proposed in JP 2004-078136 is constructed such that a plate-like member having a light reflective area does not include a fixing member such as a hinge, and can perform bistable switching of the inclination direction of the plate-like member relatively easily. The electrodes electrically contacting the conductor layer of the plate-like member and the electrodes opposing the plate-like member are divided into two groups with respect to the fulcrum member, and arbitrary potentials are applied to respective groups of the electrodes, and by switching the potentials applied to the electrodes electrically contacting the conductor layer of the plate-like member, the inclination direction of the plate-like member is easily switched. However, the control potentials applied to electrode groups are direct drive voltages, and even when an LSI, etc. are used, if the response time of the plate-like member is equal to or smaller than 5 μsec, a voltage equal to or greater than 10V is necessary. Further, when constituting an image display apparatus by combining an LSI memory with the optical deflecting device, a dedicated high voltage drive device is necessary.

SUMMARY OF THE INVENTION

The present invention has been made in view of the above-discussed and other problems and addresses the above-discussed and other problems.

Preferred embodiments of the present invention provide a novel optical deflecting device that is capable of controlling the inclination direction of a plate-like member with a several volt which is an operation voltage of a semiconductor memory device, although requiring a several dozen volt to rotate the plate-like member to switch the inclination direction of the plate-like member, a novel optical deflecting device array, a novel method for driving the optical deflecting device, and a novel image projection display apparatus using the optical deflecting device.

The principle of the present invention is as described below. A plate-like member having a light reflective area and a conductor layer is inclined with respect to a fulcrum member. A plurality of electrodes is arranged so as to oppose the plate-like member and is divided into two groups with respect to the fulcrum member, a first electrode group and a second electrode group. With respect to each electrode group, at least one electrode is a control electrode and the other electrodes are drive electrodes. Potentials of the complimentary outputs of a semiconductor memory are given to respective control electrodes of the first electrode group and the second electrode group.

For example, the high potential of the complimentary outputs of the semiconductor memory is applied to the control electrode of the electrode group on the inclined side of the plate-like member, and the low potential of the complimentary outputs of the semiconductor memory is applied to the control electrode of the electrode group on the opposite side of the plate-like member. Potentials are applied to the other electrodes (drive electrodes) of the electrode group on the opposite side of the inclined side of the plate-like member such that the potential induced in the plate-like member by electrostatic induction becomes 0V, which is the case that the average potential of the other electrodes is 0V if the areas of the other electrodes are symmetrical with respect to a symmetrical axis perpendicular to a rotation axis of the plate-like member. The plate-like member is attracted toward the other electrodes of the electrode group on the opposite side of the inclined side of the plate-like member by an electrostatic force due to the potential difference between the plate-like member and the other electrodes. On the other hand, on the inclined side of the plate-like member, the high potential of the semiconductor memory, about 5V or 3.3V, is being applied to the control electrode of the electrode group. Because the potential of the plate-like member is 0V, an electrostatic force acts between the plate-like member and the control electrode on the inclined side of the plate-like member to which the high potential of the semiconductor memory is being applied. The distance between the plate-like member and the electrodes on the inclined side of the plate-like member is set considerably small, for example, equal to or smaller than 0.1 µm. Thereby, even if the potential difference between the plate-like member and the electrodes on the side of the plate-like member where the distance between the plate-like member and the electrodes is broader (i.e., on the opposite side of the inclined side of the plate-like member) is relatively large, the electrostatic force on the side of the plate-like member where the distance between the plate-like member and the electrodes is narrower (i.e., on the inclined side of the plate-like member) is greater, so that the plate-like member remains as inclined. At this time, 0V is being applied to the electrodes of the electrode group on the inclined side of the plate-like member other than the control electrode to which the above-described high potential of the semiconductor memory device has been applied. However, by applying thereafter the low potential, normally 0V, to the control electrode of the electrode group on the inclined side of the plate-like member to which the high potential of the semiconductor memory (about 5V or 3.3V) has been applied, the potentials of all of the electrodes on the inclined side of the plate-like members become 0V and further, the potential of the plate-like member is 0V, so that the plate-like member is rotated by being attracted by the electrostatic force between the plate-like member and the other electrodes of the electrode group on the opposite side of the plate-like member and thereby the inclination direction of the plate-like member is switched.

Thus, by dividing the plurality of electrodes into two groups with respect to the fulcrum member and connecting complementary outputs of a semiconductor memory with at least one electrode each of the two electrode groups, while driving the plate-like member to rotate with a relatively high voltage to switch the inclination direction thereof, the inclination direction of the plate-like member can be controlled with a low voltage such as the operation voltage of an ordinary semiconductor memory. As the potential difference between the plate-like member and electrodes is greater, the response time in inclination displacement of the plate-like member is shorter, so that high speed driving of the plate-like member is possible. Further, it is possible to make the control voltage of the plate-like member further lower, e.g., 3.3V or smaller, so that downsizing of the semiconductor memory that is combined with the optical deflecting device is possible, and further the plate-like member can be further downsized so as to be used in realizing a high-density optical deflecting device array.

A method for driving the optical deflecting device of the present invention utilizes the above-described principle and is characterized as described below in having three states in the operation of the optical deflecting device, a state 1, a state 2, and a state 3. Here, in the present invention, in the first inclination direction of a plate-like member, light is off, that is, the plate-like member is in the OFF state, and in the second inclination direction of the plate-like member, light is on, that is, the plate-like member is in the ON state. The state 1 is the state that the plate-like member, serving as a pixel that forms an image, is kept in the first inclination direction (i.e., in the OFF state) or in the second inclination direction (i.e., in the ON state) to display the image for a designated period of time (i.e., a display period), and in this period, data specifying the ON or OFF state of the plate-like member (i.e., the inclination direction of the plate-like member) in the next state 1 is written and stored. The state 2 is the state that the plate-like member is put in the first inclination direction (in the OFF state) when the data written in the state 1 indicates the OFF state. When the written data indicates the ON state, the plate-like member is kept in the second inclination direction (in the ON state). The state 3 is the state that the plate-like member is put in the second inclination direction (in the ON state) when the written data indicates the ON state. When the written data indicates the OFF state, the plate-like member is kept in the first inclination direction (in the OFF state). The operation then returns to the next state 1 wherein the inclination direction of the plate-like member is kept to perform displaying. If this method for driving the optical deflecting device of the present invention is used for expressing gradation of a pixel with the length of time of the ON state (light is on) or the OFF state (light is off), the gradation of the pixel can be expressed by using the state 1 (the display period) as the period corresponding to the gradation.

According to an embodiment of the present invention, an optical deflecting device includes a plate-like member having a light reflective area and a conductor layer. The plate-like member rotates with substantially the middle portion thereof made a fulcrum to change an inclination direction thereof and thereby a reflection direction of a light flux incident to the light reflective area is changed. The optical deflecting device further includes a first electrode group and a second electrode group arranged so as to oppose the conductor layer of the plate-like member, respectively, and to sandwich a position corresponding to a position of the fulcrum of the plate-like member. Each electrode group includes a control electrode controlling starting of the plate-like member and a drive electrode driving the plate-like member.

According to another embodiment of the present invention, a method for driving the above-described optical deflecting devices is provided. The method includes applying complimentary outputs of a semiconductor memory to the control electrodes of the first electrode group and the second electrode group, respectively, and applying potentials to the drive electrodes of the first electrode group or the second electrode group to induce a potential in the plate-like member. The potential induced in the plate-like member by the drive electrodes of the first electrode group or the second electrode group is about a low or high potential of an operation voltage of the semiconductor memory.

According to still another embodiment of the present invention, an image projection display apparatus is provided. The apparatus includes an optical deflecting device array in which a plurality of the above-described optical deflecting devices is two-dimensionally arranged, a light source illuminating the optical deflecting device array, and a projecting optical system projecting a reflected light from the optical deflecting device array.

According to the present invention, in an optical deflecting device changing a reflection direction of an incident light by changing the inclination direction of a plate-lie member having a light reflective area, it is possible to control starting of rotating the plate-like member to change the inclination direction of the plate-like member with an operation voltage of an ordinary semiconductor memory that can fit in the area the plate-like member covers.

Further, according to the present invention, a high-definition image projection apparatus having a high-luminance and yet having a high contrast ratio can be realized by using an optical deflecting device of the present invention or an optical deflecting device array in which a plurality of the optical deflecting devices is two-dimensionally arranged for a projection optical system, because by using the optical deflecting device of the present invention as a light switch device, control of light and shade of a pixel (i.e., ON/OFF control of light switching) is excellent, the high-speed operation is possible, the long-term reliability is high, driving with a low voltage is possible, and the contrast ratio can be enhanced.

BRIEF DESCRIPTION OF THE DRAWINGS

A more complete appreciation of the present invention and many of the attended advantages thereof will be readily obtained as the present invention becomes better understood by reference to the following detailed description when considered in connection with the accompanying drawings, wherein.

DETAILED DESCRIPTION OF THE PREFERRED EMBODIMENTS

Figure 1A:
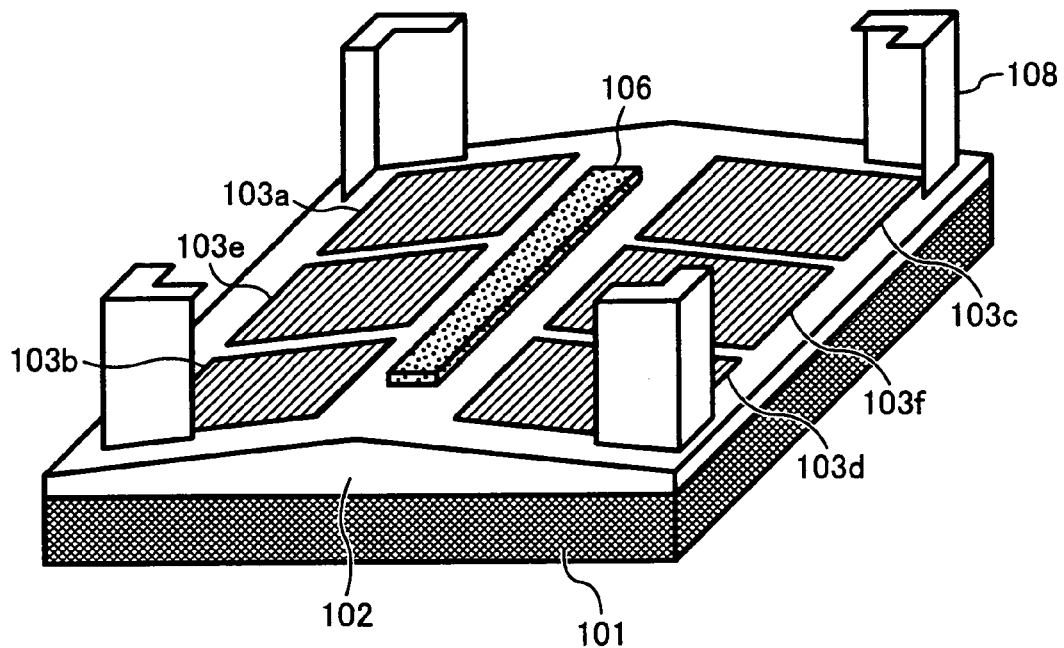
FIG. 1A and FIG. 1B are diagrams schematically illustrating an exemplary structure of an optical deflecting device according to an embodiment of the present invention, FIG. 1A illustrating the optical deflecting device without a plate-like member and FIG. 1B illustrating the optical deflecting device with the plate-like member.

Referring now to the drawings, wherein like reference numerals designate identical or corresponding parts throughout the several views, preferred embodiments of the present invention are described.

Figure 1B:
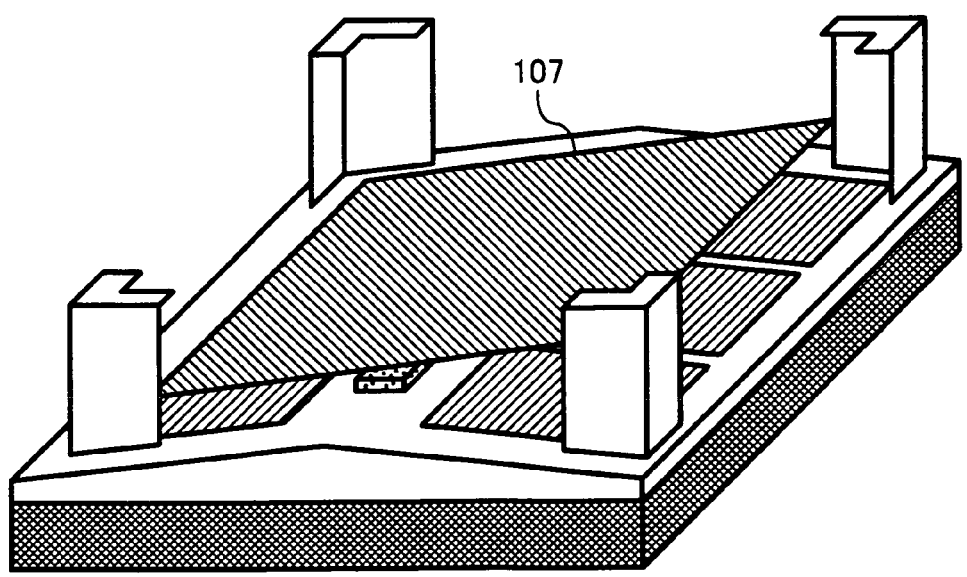

FIG. 1A and FIG. 1B are diagrams schematically illustrating an exemplary structure of an optical deflecting device according to an embodiment of the present invention. FIG. 1A illustrates the optical deflecting device without a plate-like member, and FIG. 1B illustrates the optical deflecting device with the plate-like member. In figure, a symbol 101 denotes a substrate, a symbol 102 denotes an insulating film, symbols 103a, 103b, 103c, 103d, 103e and 104d denote electrodes, respectively, a symbol 106 denotes a fulcrum member, a symbol 107 denotes a plate-like member, and symbols 108 denotes regulation members. As illustrated in FIG. 1A, the electrodes 103a, 103b, 103c, 103d, 103e and 103f are divided into two groups with respect to the fulcrum member 106 in the middle. Here, the electrodes 103a, 103b and 103e are designated as a first electrode group, and the electrodes 103c, 103d and 103f are designated as a second electrode group. These electrodes are covered with an insulating film 105 (see FIG. 4A). The regulation members 108 are arranged in four corners of the substrate 101, respectively, and stoppers in cowl-like shapes are provided at upper parts of respective regulation members 108. The plate-like member 107 has a light reflective area 107a formed on an upper surface thereof, and a conductor layer 107b is formed at least in a part of the backside thereof to oppose the electrodes 103a, 103b, 103c, 103d, 103e and 103f. The plate-like member 107 is rested on the fulcrum member 106 as illustrated in FIG. 1B, without being supported by a supporting member, etc. As described later, the plate-like member 107 is rotated with the fulcrum member 106 made a fulcrum and thereby the inclination direction thereof is changed, however, at this time, the rotation thereof is regulated by the regulation members 108 so that the plate-like member 107 will not bounce out of the substrate 101. The inclination angle of the plate-like member 107 is obtained by an arcsine of one-half of the length of the plate-like member 107 and the height of the fulcrum member 106 at the point contacting the plate-like member 107.

The plate-like member 107 rotates toward the side of the first electrode group or the second electrode group based on the result of comparing the electrostatic force between the conductor layer 107b of the plate-like member 107 and the electrode 103a and the electrode 103b of the first electrode group with the electrostatic force between the conductive layer 107b of the plate-like member 107 and the electrode 103c and the electrode 103d of the second electrode group and thereby the inclination direction of the plate-like member 107 is changed. The electrode 103*e* of the first electrode group and the electrode 103*f* of the second electrode group are electrodes controlling starting of changing the inclination direction of the plate-like member 107, and the description as to the function thereof will be made later. The electrodes 103*a*, 103*b*, 103*c* and 104 attract and drive the plate-like member 107 with the electrostatic force to be rotated to change the inclination direction thereof. Accordingly, these electrodes are herein called drive electrodes.

The group of the electrodes 103*a*, 103*b* and 104*e* (the first electrode group) and the group of the electrodes 103*c*, 103*d* and 104*f* (the second electrode group) are preferably arranged substantially symmetrically with respect to the fulcrum member 106. Further, in this embodiment, as illustrated in FIG. 1A, every electrodes of the first electrode group and the second electrode group are slanted with respect the substrate 101, however, it may be configured such that at least the control electrode 103*e* and the control electrode 103*f* are slanted with respect to the substrate 101 so as to be nearly parallel to the plate-like member 107 when the plate-like member 107 is inclined toward the control electrode 103*e* and when the plate-like member is inclined toward the control electrode 103*f*, respectively. Thereby, the control electrode 103*e* and the control electrode 103*f* can be easily made close the plate-like member 107, respectively, so that the electrostatic forces per potential difference acting between the plate-like member 107 and the control electrode 103*e* and the control electrode 103*f* can be made relatively large, respectively. Consequently, the plate-like member 107 can be attracted to the control electrode 103*e* or the control electrode 103*f* with a relatively small voltage, and the plate-like member 107 can be stably kept as inclined.

Figure 2:
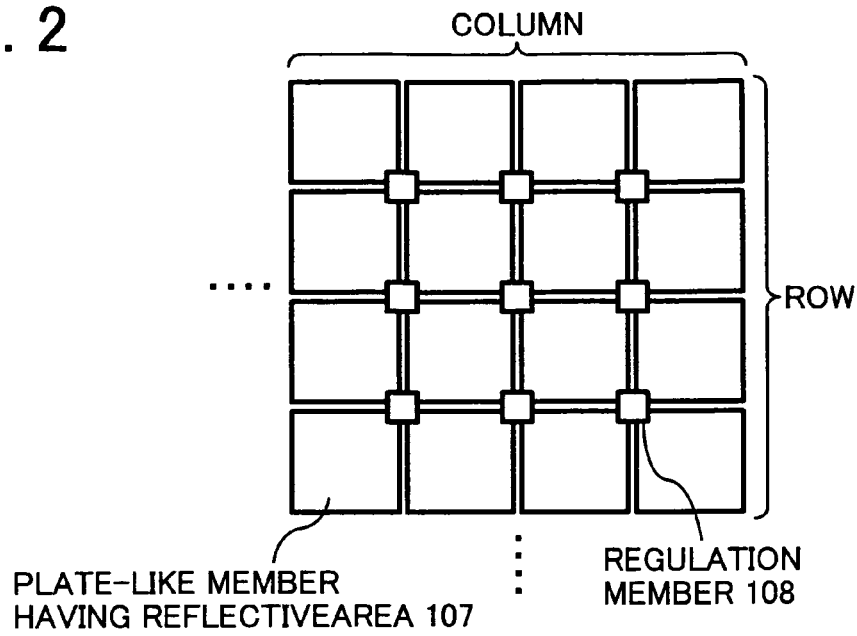
FIG. 2 is a schematic diagram illustrating an example of an optical deflecting device array in which a plurality of the optical deflecting devices is two-dimensionally arranged.

FIG. 2 is a schematic diagram illustrating an example of an optical deflecting device array in which a plurality of the above-described optical deflecting devices is arranged in a two-dimensional array. A plurality of semiconductor memories (for example, SRAMs) is similarly arranged in a two-dimensional array under the optical deflecting device array to correspond to the plurality of optical deflecting devices. Each semiconductor memory is arranged to oppose a corresponding optical deflecting device. The production method of the optical deflecting device array is described in the above-referred JP 2004-078183.

Figure 3:
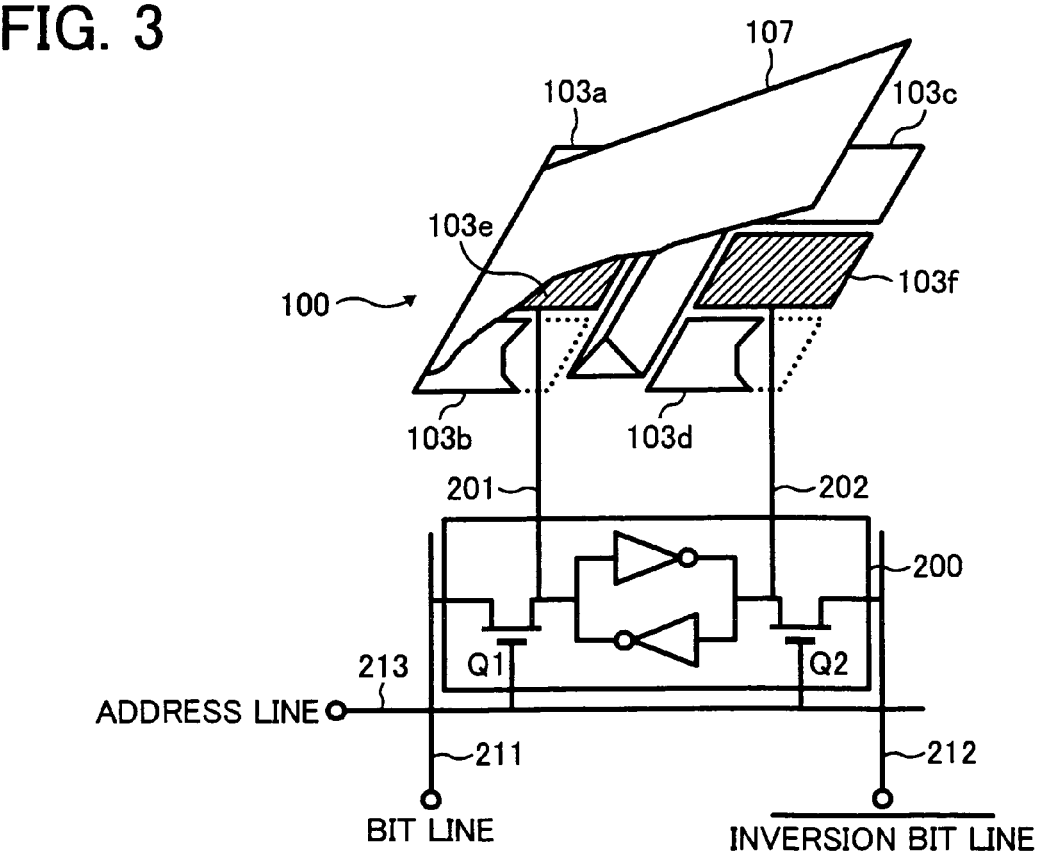
FIG. 3 is a schematic diagram illustrating an exemplary structure that a semiconductor memory is arranged under the optical deflecting device.

FIG. 3 is a schematic diagram illustrating an exemplary structure that a semiconductor memory is arranged under the optical deflecting device. A symbol 100 denotes the optical deflecting device, a symbol 200 denotes a semiconductor memory, symbols 201 and 202 denotes output lines, symbols 211 and 212 denote complimentary bit lines, and a symbol 213 denotes an address line. Corresponding to 1 or 0 of writing data, either of the bit lines 211 and 212 is in the high potential and the other is in the low potential, and corresponding to this state, the semiconductor memory is put in the complimentary state that either of the output lines 201 and 202 of transistors Q1 and Q22 is in the high potential and the other is in the low potential. The address line 213 is used for driving the transistors Q1 and Q2.

As illustrated in FIG. 3, the complimentary output lines 201 and 202 of the semiconductor memory are connected with the control electrode 103*e* and the control electrode 103*f* of the optical deflecting device 100, respectively. The control electrode 103*e* and the control electrode 103*f* are exclusively used for keeping the inclination of the plate-like member 107 so that the inclination direction thereof will not be changed.

The inclination direction of the plate-like member 107 is changed as described below. A potential difference is given to the drive electrodes on the opposite side of the inclined side of the plate-like member 107 (in FIG. 3, the electrode 103*c* and the electrode 103*d*) to induce a potential in the plate-like member 107, and thereby an electrostatic force is generated between the drive electrodes on the opposite side of the plate-like member 107 and the plate-like member 107. If the potential of each electrode on the inclined side of the plate-like member 107*a* is made substantially the same as the potential induced in the plate-like member 107, the plate-like member 107 is attracted to the drive electrodes on the opposite side of the inclined side of the plate-like member 107, so that the plate-like member 107*a* is rotated and thereby the inclination direction of the plate-like member 107 is changed. At this time, the control electrode 103*e* and the control electrode 103*f* control starting of changing the inclination direction of the plate-like ember 107. As illustrated in FIG. 1A, in this embodiment, the number of the electrodes is 6, 4 drive electrodes and 2 control electrodes, and in this case, the number of the electrodes is the minimum, the area of each electrode can be effectively used, and the production process is facilitated.

When using an optical deflecting device array in which a plurality of the optical deflecting devices is arranged in a two-dimensional array in a high-definition projection apparatus, etc., a large number of the optical deflecting devices, each constituting a pixel, are required. On the other hand, the number of outgoing lines from one optical deflecting device array cannot be made so large. Accordingly, a semiconductor memory is arranged under each optical deflecting device constituting a pixel, and data is written and reflected on the optical deflecting device with a circuit arranged around the optical deflecting device array by dividing the period. The operation voltage of a semiconductor memory is about 5V or below. The size of a plate-like member has influence on the size of a pixel, and it is preferable that the semiconductor memory is fit in the area the plate-like member covers. If the plate-like member is the one 15 μm square or smaller, the operation voltage is normally about 5V. To make the plate-like member operable with a several dozen volt, a semiconductor process for a well, etc. in a special construction is required, and the production cost remarkably increases.

In the optical deflecting device of the present invention, a semiconductor memory with a typical operation voltage, such as a SRAM, is arranged in a low layer thereof, and starting of inclination change of the plate-like member 107 can be controlled with a voltage of about 5V as described next.

The plate-like member 107 starts inclination change by an electrostatic force between the drive electrodes far from the plate-like member 107 (the drive electrodes on the opposite side of the inclined side of the plate-like member 107) and the plate-like member 107, which is generated by the potential difference between the drive electrodes far from the plate-like member 107 and the plate-like member 107. With respect to the potential difference between the electrodes close to the plate-like member 107 on the inclined side of the plate-like member 107 and the plate-like member 107*a*, the electrostatic force, which is greater than the electrostatic force between the electrodes far from the plate-like member 107 and the plate-like member 107 several hundred times per potential difference, acts. Even when the area of the control electrode is about one third of the whole electrode area, the electrostatic force two hundred times larger can be obtained. Further, because the electrostatic force is in proportion to a square of a voltage, the drive voltage can be made about 10 times of the control voltage. If the control voltage is 5V, when the potential difference between the drive electrodes and the plate-like member 107 is 50V, the electrostatic force between the control electrode on the inclined side of the plate-like member 107 and the plate-like member 107 and the electrostatic force between the drive electrodes on the opposite side of the plate-like member 107 and the plate-like member 107 balance. That is, by applying +50V to the drive electrodes on the opposite side of the inclined side of the plate-like member 107, the electrostatic force between the control electrode on the inclined side of the plate-like member 107 and the plate-like member 107 and the electrostatic force between the drive electrodes on the opposite side of the plate-like member 107 and the plate-like member 107a balance. To keep the plate-like member 107 as inclined at each control electrode most surely, the drive voltage of up to about ±40V can be used for the drive electrodes on the opposite side of the inclined side of the plate-like member 107. When the control voltage is 3.3V, the drive voltage of up to about ±26V can be used for the drive electrodes on the opposite side of the inclined side of the plate-like member 107. The plate-like member 107 of 10 μm square inclined at 12° can be driven with the drive voltage of about ±20V, and it is possible to keep the inclined plate-like member 107 at the control electrode easily. When the operation voltage of a semiconductor memory connected with the control electrode is about 3.3V, if the semiconductor memory is a SRAM constituted of 6 transistors, it can be easily fit in the area of 10 μm square. Further, in the optical deflecting device illustrated in FIG. 1A and FIG. 1B, the plate-like member 102 does not include a torsion-hinge, so that the size of the plate-like member 107 is not influenced by the difficulty of increasing the stiffness of the torsion hinge and/or processing the torsion-hinge, which arises when the torsion-hinge needs to be decreased.

Figure 4A:
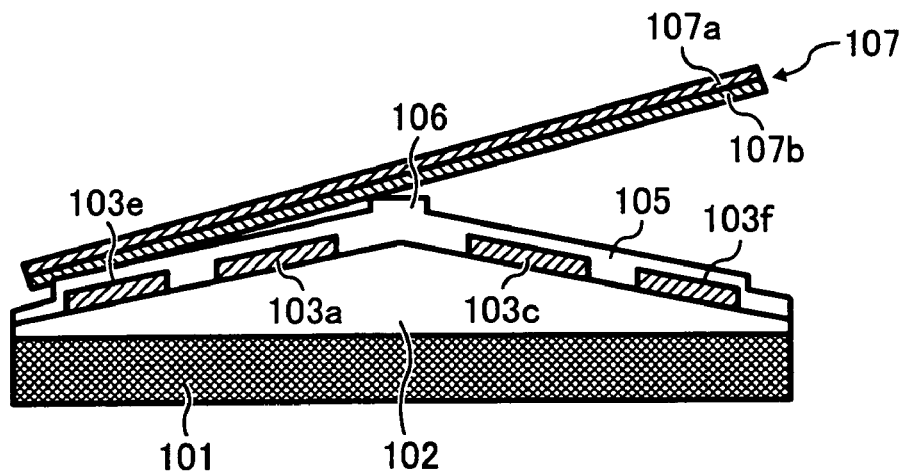
FIG. 4A and FIG. 4B are diagrams illustrating a variation of the optical deflecting device, FIG. 4A being a cross section of the optical deflecting device with the plate-like member and FIG. 4B being a plane view of the optical deflecting device without the plate-like member.
Figure 4B:
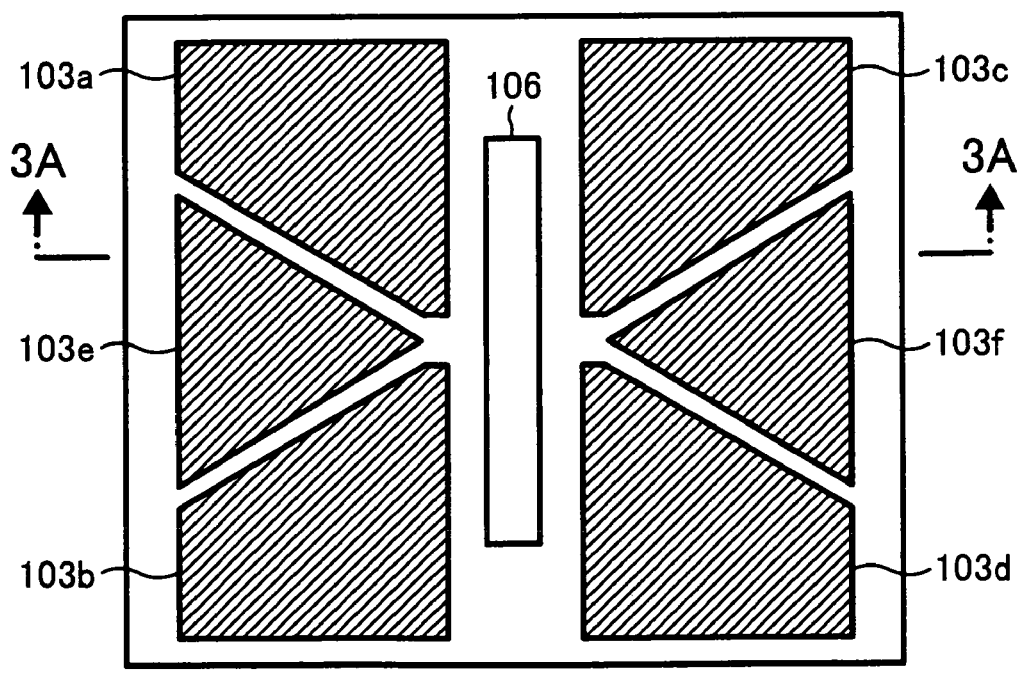

FIG. 4A and FIG. 4B illustrate a variation of the optical deflecting device. FIG. 4A is a cross section of the optical deflecting device with the plate-like member 107, and FIG. 4B is a plane view of the optical deflecting device without the plate-like member 107. In this variation, the control electrode 103e and the control electrode 103f are respectively formed in reversed triangle shapes with respect to the fulcrum member 106 of the plate-like member 107, so that the areas of the control electrode 103e and the control electrode 103f are respectively made broader toward the periphery side (distant side) of the plate-like member 107 with respect to the fulcrum member 106. Thereby, each momentum with the control electrode 103e and the control electrode 103f to the plate-like member 107 can be increased, so that the inclination direction of the plate-like member 107 can be easily kept. Further, the areas of the drive electrodes 103a, 103b, 103c and 103d can be made broader and thereby the momentum for driving the plate-like member 107 can be increased, so that it is enabled to enhance the response speed or to decrease the drive voltage.

Figure 5A:
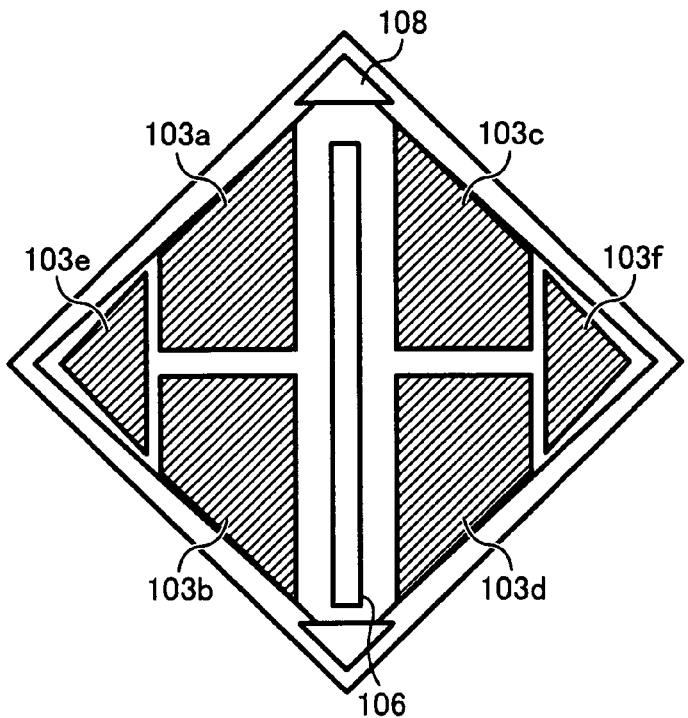
FIG. 5A, FIG. 5B, FIG. 5C, FIG. 5D and FIG. 5E are diagrams illustrating another variation of the optical deflecting device, FIG. 5A being a plane view of the optical deflecting device without the plate-like member, FIG. 5B being a perspective view of the optical deflecting device without the plate-like member, FIG. 5C being a cross section of the optical deflecting device with the plate-like member, FIG. 5D being a plane view of the optical deflecting device with the plate-like member, and FIG. 5E being a view of the optical deflecting device in a state that the plate-like member is inclined.
Figure 5B:
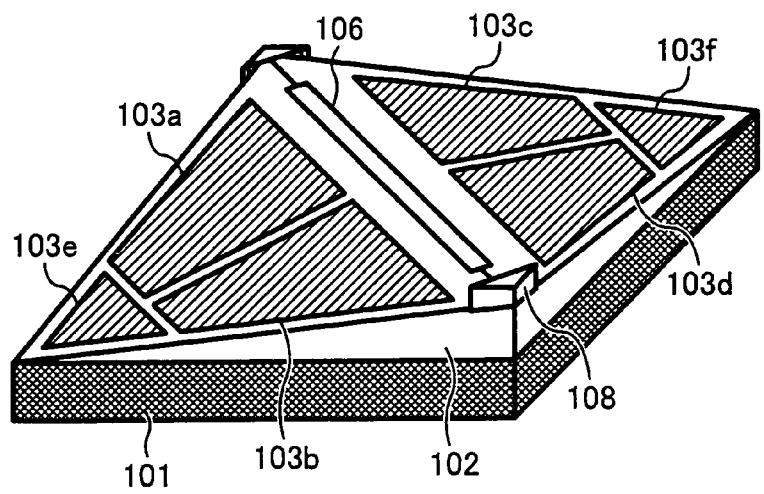
Figure 5C:
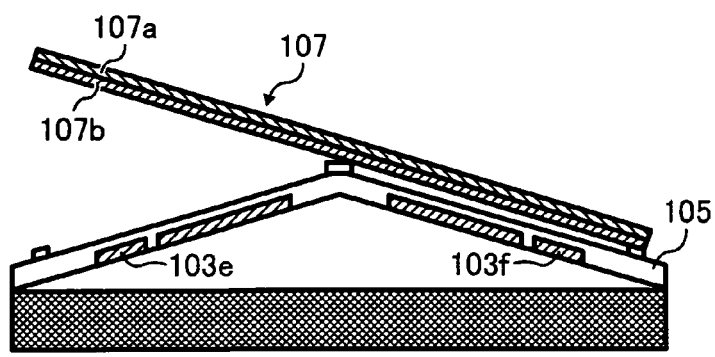
Figure 5D:
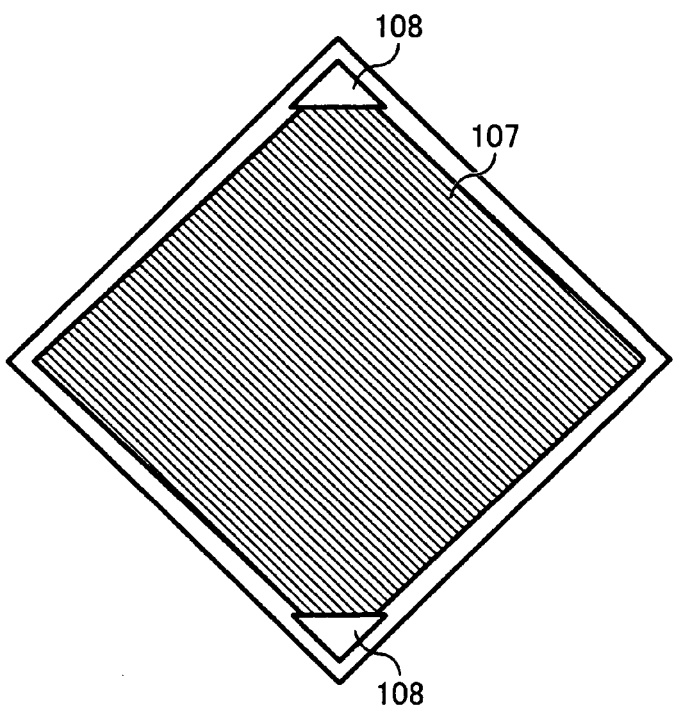
Figure 5E:
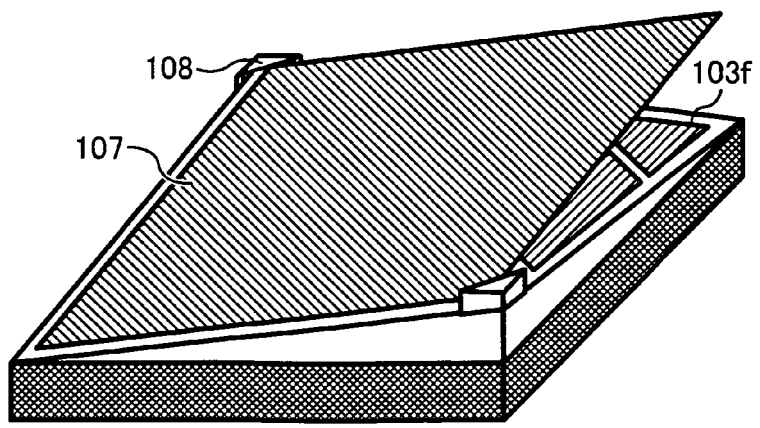

FIG. 5A, FIG. 5B, FIG. 5C, FIG. 5D and FIG. 5E illustrate another variation of the optical deflecting device, in which a diagonal line of the plate-like member 107 is parallel to the fulcrum member 106 and serves as the rotation axis, and the plate-like member 107 rotates with respect to another diagonal line of the plate-like member 107. FIG. 5A is a plane view of the optical deflecting device without the plate-like member 107, FIG. 5B is a perspective view of the optical deflecting device without the plate-like member 107, FIG. 5C is a cross section of the optical deflecting device with the plate-like member 107, FIG. 5D is a plane view of the optical deflecting device with the plate-like member 107, and FIG. 5E is a view of the optical deflecting device in a state that the plate-like member 107 is inclined.

In this variation, the drive electrodes 103a and 103b and the drive electrode 103c and 103d are arranged symmetrically with respect to the fulcrum member 106 close to the fulcrum member 106, and the control electrodes 103e and 103f are arranged outside the drive electrodes 103a and 103b and the drive electrodes 103c and 103d far from the fulcrum member 106. Thereby, the drive electrodes 103a, 103b, 103c and 103d generating the electrostatic drive torque can be made relatively large. When causing the electrostatic force to act on the plate-like member 107 with the control electrode 103e or the control electrode 103f, because the control electrode 103e and the control electrode 103f are far from the fulcrum member 106, a larger electrostatic force is generated than when the control electrode 103e and the control electrode 103f are close to the fulcrum member 106. If the average distance to the fulcrum member 106 is twice, it corresponds to that the electrostatic force is twice large. Because the diagonal line of the plate-like member 107 is the rotation axis, the distances between the fulcrum member 106 and the control electrode 103e and the control electrode 103f are made the longest, respectively. The control electrodes 103e and the control electrode 103f can be arranged to oppose corners of the plate-like member 107, respectively, as illustrated in FIG. 5A. In this case, even when the area ratio between the control electrode and the drive electrodes is for example about one to eight, the sufficient momentum can be obtained with the control electrode. Further, because the areas of the drive electrodes can be made relatively large, the momentum for driving the plate-like member 107 can be made relatively large also.

In each of the above-described variations of the optical deflecting device illustrated in FIG. 4A and FIG. 4B and in FIG. 5A, FIG. 5B, FIG. 5C, FIG. 5D and FIG. 5E, respectively, by arranging the control electrode 103e and the control electrode 103f in the center position of a symmetrical axis perpendicular to the rotation axis of the plate-like member 107 (symmetrical positions with respect to a center point on the position of the fulcrum of the plate-like member 107), respectively, when the plate-like member 107 is positioned on the control electrode 103e or the control electrode 103f, the plate-like member 107 can most withstand the force of separating the plate-like member 107 from the control electrode 103e or the control electrode 103f by the torsion momentum with respect to the symmetrical axis of the plate-like member 107. That is, if the control electrode 103e and the control electrode 103f are arranged in the center of the symmetrical axis perpendicular to the rotation axis of the plate-like member 107, when the plate-like member 107 has been attracted by the control electrode 103e or the control electrode 103f, the moment to separate the plate-like member 107 from the control electrode 103e or the control electrode 103f is relatively small. Because the electrostatic force is in reverse proportion to the square of distance, the electrostatic force decreases as the distance is slightly increased. Accordingly, as the separating moment is smaller, the plate-like member 107 can be more stably kept at the control electrode 103e or the control electrode 103f.

Figure 6A:
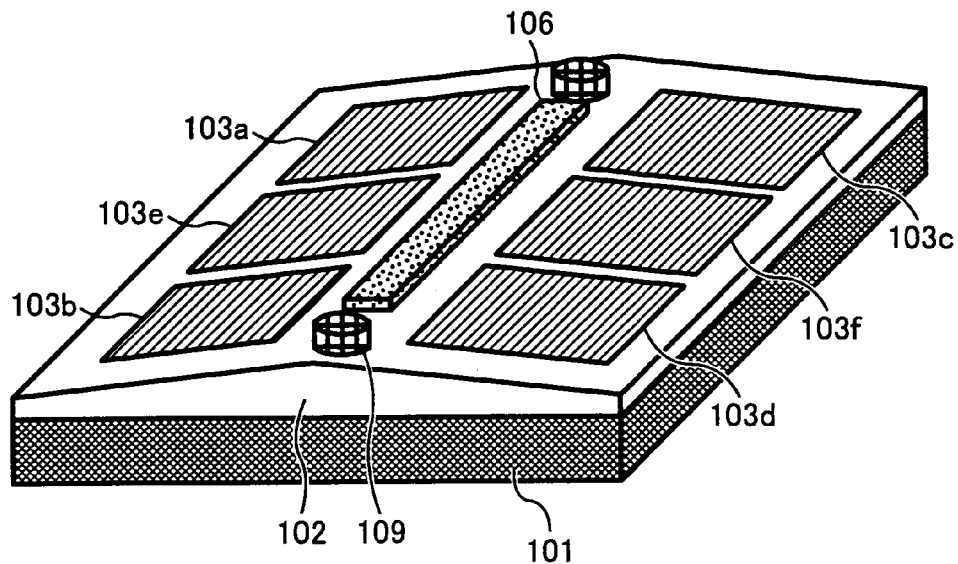
FIG. 6A and FIG. 6B are diagrams illustrating a structure of an optical deflecting device according to another embodiment, in which a hinge is used for determining the rotation axis of a plate-like member, FIG. 6A illustrating the optical deflecting device without the plate-like member and FIG. 6B illustrating the optical deflecting device with the plate-like member.
Figure 6B:
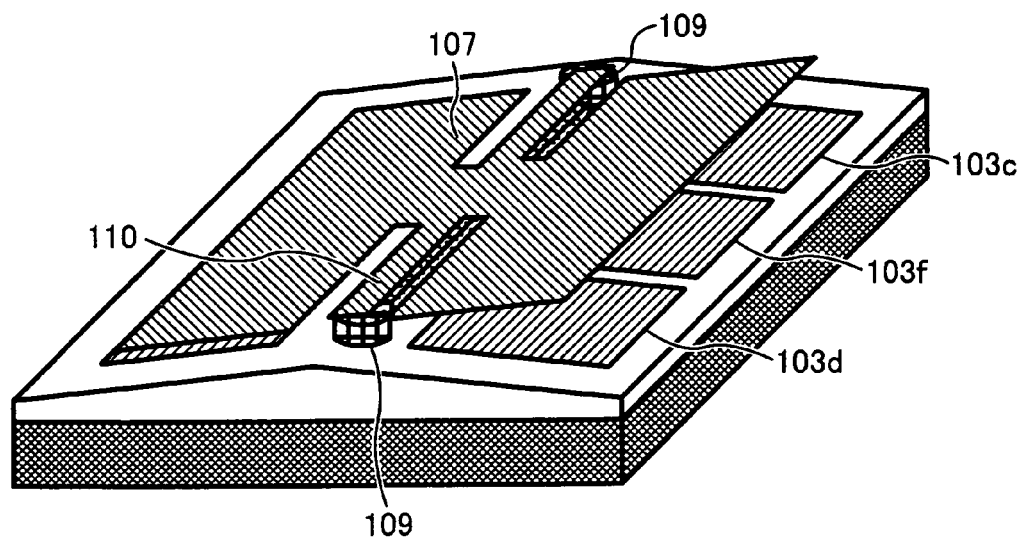

FIG. 6A and FIG. 6B are diagrams illustrating a structure of an optical deflecting device according to another embodiment of the present invention, in which a hinge is used for determining the rotation axis of the plate-like member 107. FIG. 6A illustrates the optical deflecting device without the plate-like member 107, and FIG. 6B illustrates the optical deflecting device with the plate-like member 107. In FIG. 6A and FIG. 6B, the same symbols as those in FIG. 1A and FIG. 1B indicate identical or corresponding parts.

As illustrated in FIG. 6A, the electrodes 103a, 103b, 103c, 103d, 103e and 103f are provided on the substrate 101 via the insulating film 102 while being divided into two groups with respect to the fulcrum member 106. Here also, the group of the electrodes 103a, 103c and 103e is designated as the first electrode group and the group of the electrodes 103c, 103d and 103f is designated as the second electrode group. These electrodes are covered with the insulating film 105 (not shown) as in the previous embodiment described with reference to FIG. 3A. The plate-like member 107 has the light reflective area 107a formed on the upper surface thereof, and the conductor layer 107b is formed at least in a part of the backside thereof to oppose the electrodes 103a, 103b, 103c, 103d, 103e and 103f as in the previous embodiment. In this embodiment, as illustrated in FIG. 6B, the plate-like member 107 includes a hinge 110, which is relatively weak in stiffness, and is slantingly placed on the fulcrum member 106. The hinge 110 is provided for determining the rotation axis of the plate-like member 107. The hinge 110 is fixed to support columns 109, and the plate-like member 107 is rotatable to some degree by the hinge 110. The inclination angle of the plate-like member 107 is obtained by an arcsine of one-half of the length of the plate-like member 107 and the height of the fulcrum member 106 at the point contacting the plate-like member 107.

In this embodiment also, the plate-like member 107 rotates toward the side of the first electrode group or the second electrode group based on the result of comparing the electrostatic force between the conductor layer 107b of the plate-like member 107 and the electrode 103a and the electrode 103b of the first electrode group with the electrostatic force between the conductive layer 107b of the plate-like member 107 and the electrode 103c and the electrode 103d of the second electrode group and thereby the inclination direction of the plate-like member 107 is changed. The electrode 103e of the first electrode group and the electrode 103f of the second electrode group are electrodes controlling starting of changing the inclination direction of the plate-like member 107. Here also, the electrodes 103a, 103b, 103c and 103d are called the drive electrodes, and the electrodes 103e and 103f are called the control electrodes.

In this embodiment also, the group of the electrodes 103a, 103b and 104e (the first electrode group) and the group of the electrodes 103c, 103d and 104f (the second electrode group) are preferably arranged substantially symmetrically with respect to the fulcrum member 106. Further, in FIG. 6A, every electrodes of the first electrode group and the second electrode group are slanted with respect the substrate 101, however, as in the previous embodiment, it may be configured such that at least the control electrode 103e and the control electrode 103f are slanted with respect to the substrate 101 so as to be nearly parallel to the plate-like member 107 when the plate-like member 107 is inclined toward the control electrode 103e and when the plate-like member is inclined toward the control electrode 103f, respectively.

Here, the hinge 110 is provided for determining the rotation axis of the plate-like member 107 as described above, so that the hinge 110 is not required to have the stiffness sufficient for restoring the plate-like member 107 to the position parallel to the substrate 101. When the hinge 110 has hung due to weak stiffness, the hinge 110 is supported on the fulcrum member 106. In a system in which the inclination direction of a plate-like member is changed using a restoring force of a torsion hinge of the plate-like member, if plastic deformation occurs in the torsion hinge and the plate-like member remains as inclined even if the drive voltage is 0V, an erroneous operation is caused in changing the inclination direction of the plate-like member. In this respect, in this embodiment, as long as the rotation axis of the plate-like member 107 can be determined with the hinge 110, even if plastic deformation occurs in the hinge 110, no problem is caused in changing the inclination direction of the plate-like member 107.

Now, the operation of the optical deflecting device is described. Here, the description will be made taking the structure illustrated in FIG. 1A and FIG. 1B for example, however, the same applies to the cases of FIG. 4A and FIG. 4B, FIG. 5A through FIG. 5E, and FIG. 6A and FIG. 6B. When expressing gradation with an optical deflecting device capable of turning on and off light, generally, the gradation is expressed with the length of a display period. Here, in FIG. 1A and FIG. 1B, the inclination direction of the plate-like member 107 toward the electrode 103a and the electrode 103b is the first inclination direction, and when the plate-like member 107 is in the first inclination direction, the light reflected by the plate-like member 107 is not output, i.e., the light is off, which state is designated as the OFF state. The inclination direction of the plate-like member 107 toward the electrode 103c and the electrode 103d is the second inclination direction, and when the plate-like member 107 is in the second inclination direction, the light reflected by the plate-like member 107 is output, i.e., the light is on, which state is designated as the ON state. Hereinafter, the electrodes 103a, the electrode 103b, the electrode 103c and the electrode 103d are simply called the electrode "a", the electrode "b", the electrode "c" and the electrode "d", and the electrode 103e and the electrode 103f are simply called the electrode "e" and the electrode "f".

Figure 7:
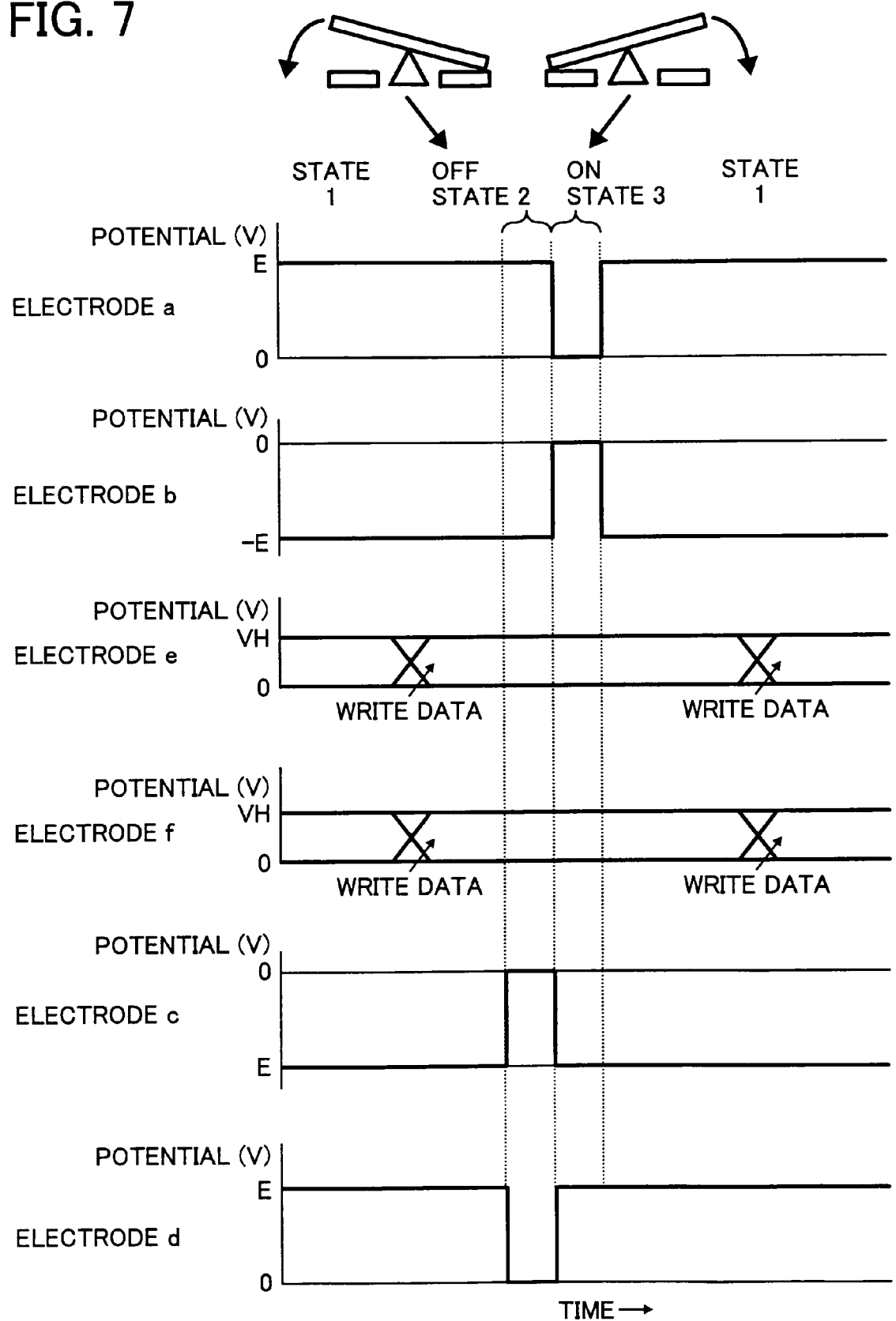
FIG. 7 is a timing chart for explaining state transition of the optical deflecting device.

FIG. 7 is a timing chart illustrating state transition of the optical deflecting device. The horizontal axis indicates the passage of time, and the vertical axis indicates the potentials of the electrode "a" (103a), the electrode "b" (103b), the electrode "e" (103e), the electrode "f" (103f), the electrode "c" (103c), and the electrode "d" (103d). The state 1 is the state as described above that the plate-like member 107, serving as a pixel that forms an image, is kept in the first inclination direction (i.e., in the OFF state) or in the second inclination direction (i.e., in the ON state) for displaying the image for a designated period of time (i.e., a display period). The state 1 is also the state that data indicating the inclination direction of the plate-like member 107 is written and stored in a semiconductor memory. In the state 1, the inclination direction of the plate-like member 107 for displaying is kept. In the state 2, as described above also, according to the data written and stored in the semiconductor memory in the state 1, if the data indicates the instruction of turning off light, the plate-like member 107 inclines in the first inclination direction to be in the OFF state. If the plate-like member 107 has been in the OFF state at that time, the OFF state of the plate-like member 107 is kept. Even if the data indicates the instruction of turning on light, the inclination direction of the plate-like member 107a does not change and the plate-like member 107 is kept as it is. In the state 3, according to the data written and stored in the state 1, if the data indicates the instruction of turning on light, the plate-like member 107 inclines in the second inclination direction and turns into the ON state. If the plate-like member 107a has been in the ON state at that time, the ON state of the plate-like member 107 is kept, that is, the inclination direction of the plate-like member 107 does not change. If the data indicates the instruction of turning off light, because the plate-like member 107 has been already in the OFF state in the state 2, the OFF state of the plate-like member 107 is kept. Thereafter, the optical deflecting device is turned into the state 1, and performs displaying, and writes and stores data indicating the next inclination direction of the plate-like member 107. The above-described shifting of states is performed by the whole elements or a plurality of elements (the optical deflecting devices) constituting an optical deflecting device array. The operation sequence from the state 2 to the state 3 may be reversed.

Figure 8A:
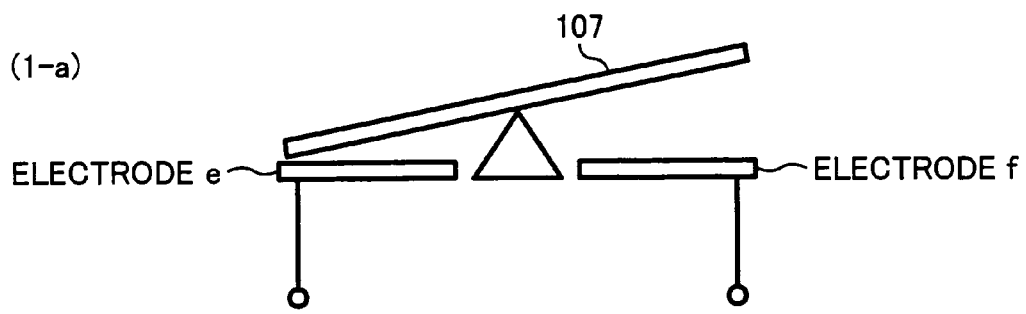
FIG. 8A is a diagram illustrating the relation between the potentials of respective electrodes and the inclination direction of the plate-like member in a state 1 of the optical deflecting device.
Figure 8A:
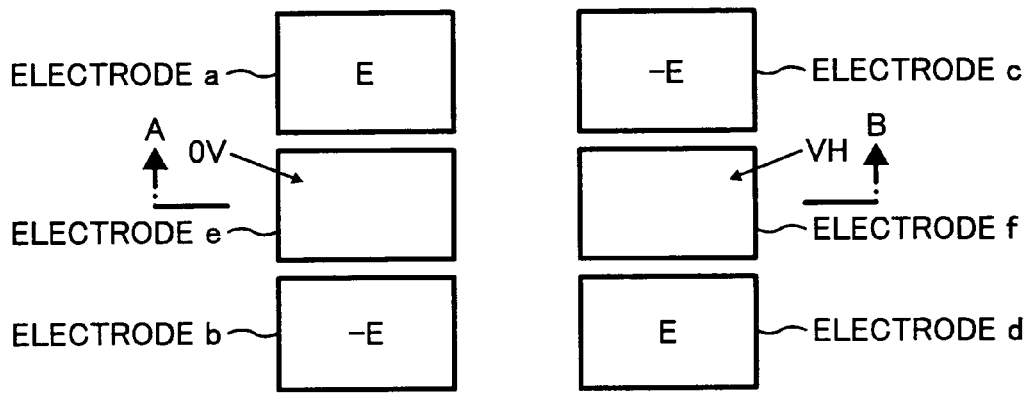
Figure 8A:
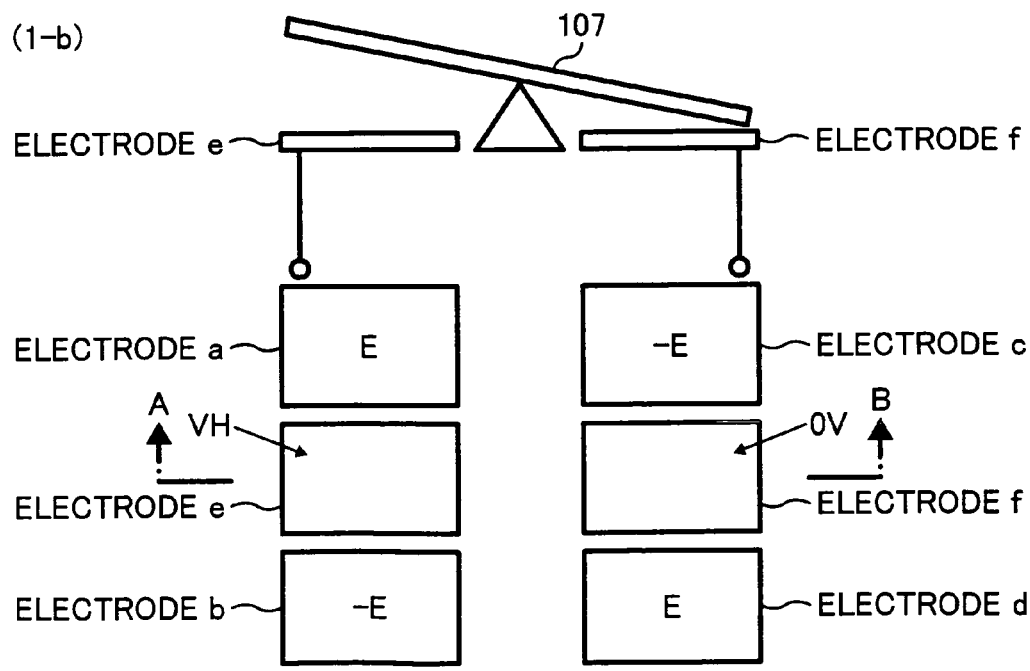
Figure 8B:
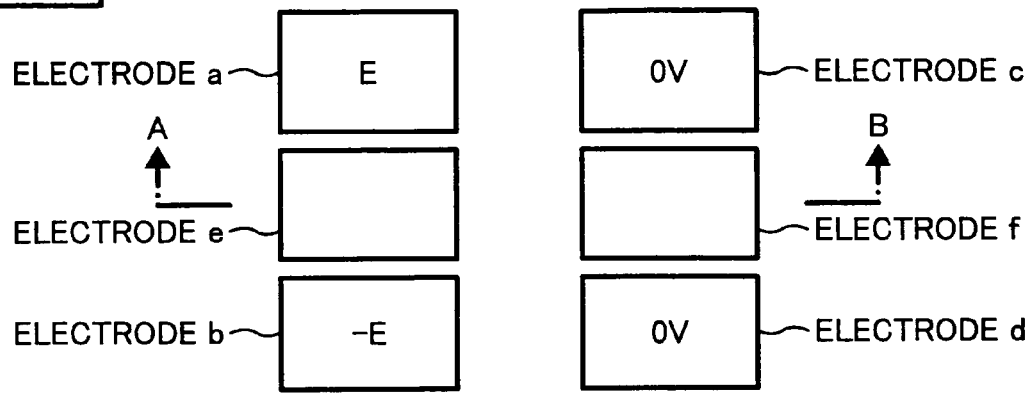
FIG. 8B is a diagram illustrating the relation between the potentials of respective electrodes and the inclination direction of the plate-like member in a state 2 of the optical deflecting device.
Figure 8B:
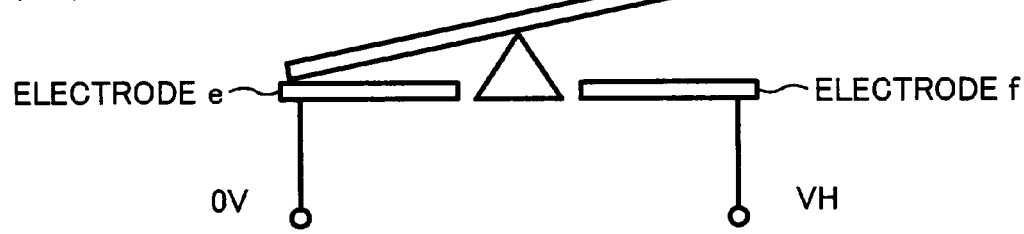
Figure 8B:
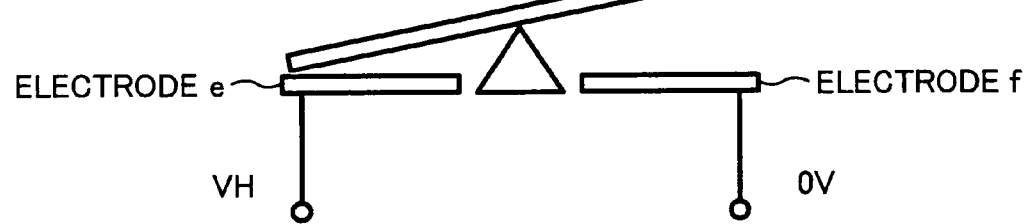
Figure 8B:
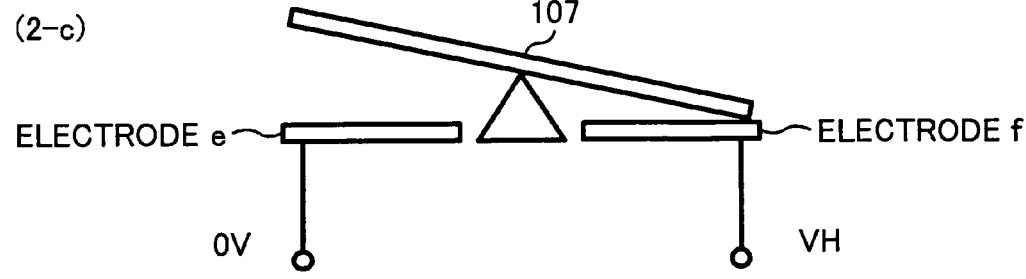
Figure 8B:
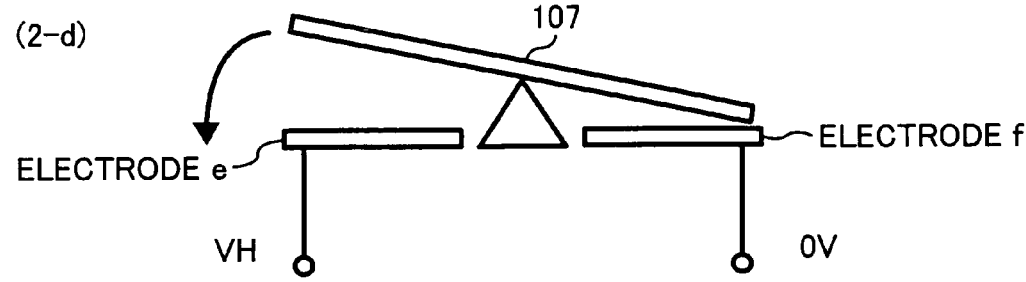
Figure 8C:
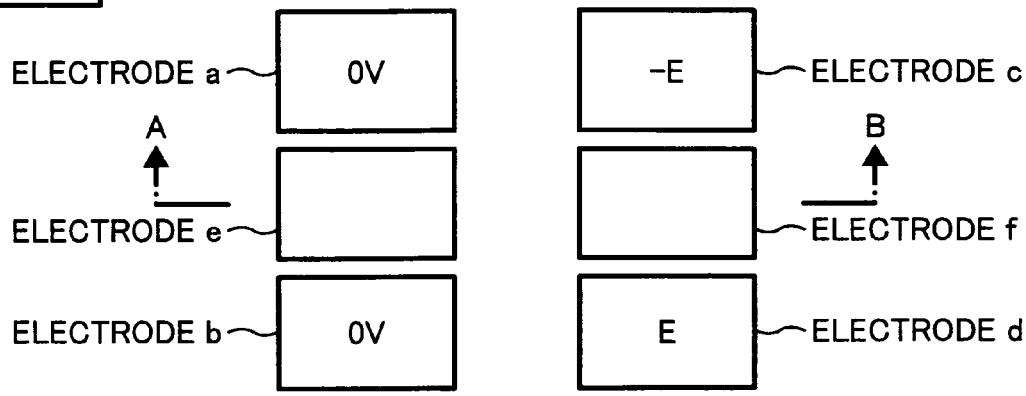
FIG. 8C is a diagram illustrating the relation between the potentials of respective electrodes and the inclination direction of the plate-like member in a state 3 of the optical deflecting device.
Figure 8C:
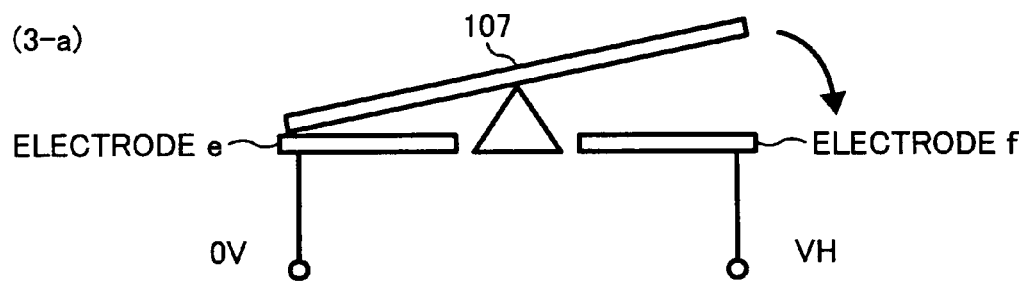
Figure 8C:
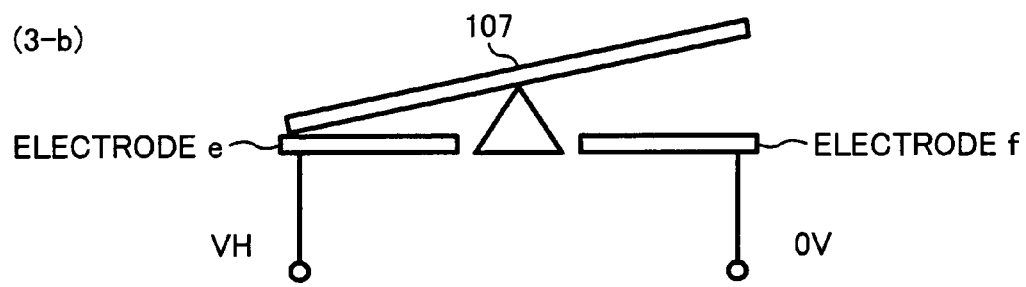
Figure 8C:
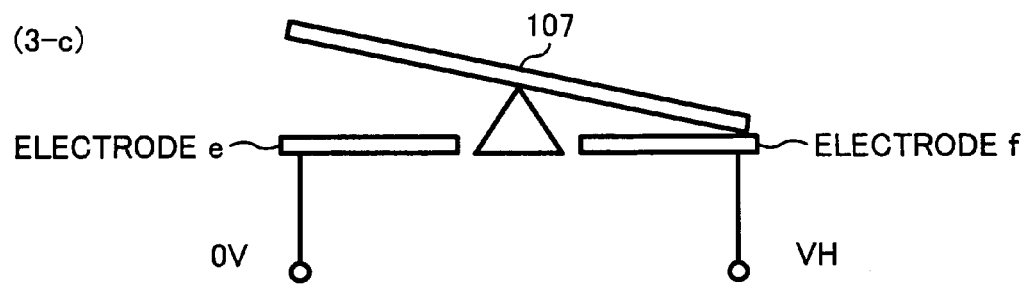
Figure 8C:
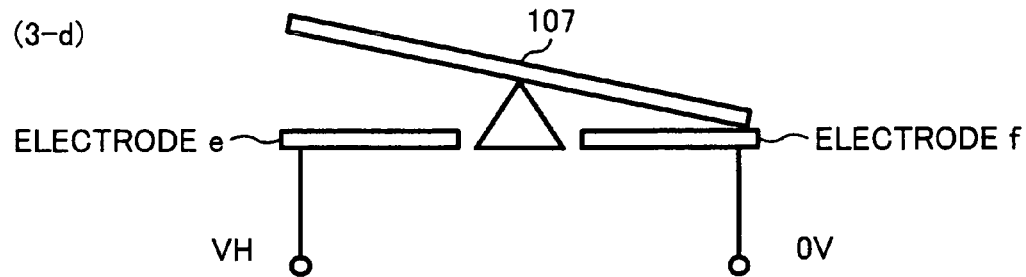

FIG. 8A, FIG. 8B and FIG. 8C illustrate the relations between the potentials of respective electrodes and the inclination direction of the plate-like member 107 in the state 1, the state 2 and the state 3, respectively.

First, the relation between the potentials of respective electrodes and the inclination direction of the plate-like member 107 in the state 1 is described referring to FIG. 8A.

A state 1(1-a) of FIG. 8A is the state that the plate-like member 107 is inclined in the first inclination direction toward the electrode "a" and the electrode "b", that is, the plate-like member 107 is in the OFF state, and the potential of the electrode "a" is E(V), the potential of the electrode "b" is −E(V), the potential of the electrode "c" is −E(V) and the potential of the electrode "d" is E(V), so that the potential of the plate-like member 107 is substantially 0V. The symmetrical axis perpendicular to the rotation axis of the plate-like member 107 is in the intermediate position between the electrode "a" and the electrode "b" and between the electrode "c" and the electrode "d", and the potential of the plate-like member 107 induced by electrostatic induction is 0V which is the intermediate potential of the electrode "a" and the electrode "b" and the electrode "c" and the electrode "d". Because the plate-like member 107 is close to the electrode "a" and the electrode "b", the electrostatic force between the plate-like member 107 and the electrode "a" and the electrode "b" is strong. Therefore, regardless of whether the potential of the electrode "e" or the potential of the electrode "f" is 0V or VH, the plate-like member 107 continues to be inclined in the first inclination direction toward the electrode "a" and the electrode "b". Thus, in the state 1(1-a) of FIG. 8A, even if the instruction as to the inclination direction of the plate-like member 107 indicates the ON state and the potential of the electrode "e" is 0V and the potential of the electrode "f" is VH, the plate-like member 107 continues to be inclined toward the electrode "a" and the electrode "b" and is kept in the OFF state.

A state 1(1-b) of FIG. 8A is the state that the plate-like member 107 is inclined in the second inclination direction toward the electrode "c" and the electrode "d" and is in the ON state, and the potential of the electrode "a" is E(V), the potential of the electrode "b" is −E(V), the potential of the electrode "c" is −E(V) and the potential of the electrode "d" is E(V), so that the potential of the plate-like member 107 is substantially 0V. The symmetrical axis perpendicular to the rotation axis of the plate-like member 107 is in the intermediate position between the electrode "a" and the electrode "b" and between the electrode "c" and the electrode "d", and the potential of the plate-like member 107a induced by electrostatic induction is 0V which is the intermediate potential of the electrode "a" and the electrode "b" and the electrode "c" and the electrode "d". Because the plate-like member 107 is close to the electrode "c" and the electrode "d", the electrostatic force between the plate-like member 107 and the electrode "c" and the electrode "d" is strong. Therefore, regardless of whether the potential of the electrode "e" or the potential of the electrode "f" is 0V or VH, the plate-like member 107 continues to be inclined in the second inclination direction toward the electrode "c" and the electrode "d". Thus, in the state 1(1-b) of FIG. 8A, even if the instruction as to the inclination direction of the plate-like member 107 indicates the OFF state and the potential of the electrode "e" is VH and the potential of the electrode "f" is 0V, the plate-like member 107 continues to be inclined toward the electrode "c" and the electrode "d" and is kept in the ON state.

In both of the state 1(1-a) and the state 1(1-b), the potential of the electrode "a" is E(V), the potential of the electrode "b" is −E(V), the potential of the electrode "c" is −E(V), and the potential of the electrode "d" is E(V), so that it is possible to keep attracting the plate-like member 107 toward the substrate. That is, the inclination direction of the plate-like member 107 can be kept in a stable manner.

Next, the relation between the potentials of respective electrodes and the inclination direction of the plate-like member 107 in the state 2 is described referring to FIG. 8B. In the state 2 illustrated in FIG. 8B, the potential of the electrode "a" is E(V), the potential of the electrode "b" is −E(V), the potential of the electrode "c" is 0V, and the potential of the electrode "d" is 0V.

A state 2(2-a) of FIG. 8B is the state that the plate-like member 107 is inclined in the first inclination direction toward the electrode "a" and the electrode "b" and is in the OFF state, the instruction as to the inclination direction of the plate-like member 107 in the state 1 indicates the ON state, and the potential of the electrode "e" is 0V and the potential of the electrode "f" is VH. The potential of the plate-like member 107 is 0V due to that the potential of the electrode "a" is E(V) and the potential of the electrode "b" is −E(V), and the plate-like member 107 is attracted by the electrostatic force between the plate-like member 107 and the electrode "a" and the electrode "b", so that the inclination direction of the plate-like member 107 in the first inclination direction toward the electrode "a" and the electrode "b" is kept.

A state 2(2-b) of FIG. 8B is the state that the plate-like member 107 is inclined in the first inclination direction toward the electrode "a" and the electrode "b" and is in the OFF state, the instruction as to the inclination direction of the plate-like member 107 in the state 1 indicates the OFF state, and the potential of the electrode "e" is VH and the potential of the electrode "f" is 0V. The potential of the plate-like member 107 is 0V due to that the potential of the electrode "a" is E(V) and the potential of the electrode "b" is −E(V), and the plate-like member 107 is attracted by the electrostatic force between the plate-like member 107 and the electrode "a" and the electrode "b", so that the inclination direction of the plate-like member 107 in the first inclination direction toward the electrode "a" and the electrode "b" is kept.

A state 2(2-c) of FIG. 8B is the state that the plate-like member 107 is inclined in the second inclination direction toward the electrode "c" and the electrode "d" and is in the ON state, the instruction as to the inclination direction of the plate-like member 107 in the state 1 indicates the ON state, and the potential of the electrode "e" is 0V and the potential of the electrode "f" is VH. The potential of the plate-like member 107 is 0V due to that the potential of the electrode "a" is E(V) and the potential of the electrode "b" is −E(V), and the plate-like member 107 is attracted by the electrostatic force between the plate-like member 107 and the electrode "a" and the electrode "b". However, the electrode "f" is close to the plate-like member 107. Further, the potential of the electrode "f" is VH and a relatively large electrostatic force acts on the plate-like member 107. Therefore, the plate-like member 107 continues to be inclined in the second inclination direction toward the electrode "c" and the electrode "d".

A state 2(2-d) of FIG. 8B is the state that the plate-like member 107 is inclined in the second inclination direction toward the electrode "c" and the electrode "d" and is in the ON state, the instruction as to the inclination direction of the plate-like member 107 in the state 1 indicates the OFF state, and the potential of the electrode "e" is VH and the potential of the electrode "f" is 0V. The potential of the plate-like member 107 is 0V due to that the potential of the electrode "a" is E(V) and the potential of the electrode "b" is −E(V). Because the potential of the electrode "f" that is close to the plate-like member 107 is 0V, the electrostatic force is not generated between the plate-like member 107 and the electrode "f". On the other hand, the plate-like member 107 is attracted by the electrostatic force generated between the plate-like member 107 and the electrode "a" and the electrode "b" due to that the potential of the electrode "a" is E(V) and the potential of the electrode "b" is –E(V). Therefore, the inclination direction of the plate-like member 107 is switched to the first inclination direction toward the electrode "a" and the electrode "b" to be in the OFF state. At this time, because the potentials of the whole electrodes on the inclined side of the plate-like member 107 are the same as the potential of the plate-like member 107, the electrostatic force is not generated between the plate-like member 107 and the electrodes on the inclined side of the plate-like member 107. Therefore, the plate-like member 107 is not inhibited from being inclined in the opposite inclination direction. The potential of the plate-like member 107 may be set not only to 0V but also to VH.

Next, the relation between the potentials of respective electrodes and the inclination direction of the plate-like member 107 in the state 3 is described referring to FIG. 8C. In the state 3 illustrated in FIG. 8C, the potential of the electrode "a" is 0V, the potential of the electrode "b" is 0V, the potential of the electrode "c" is –E(V), and the potential of the electrode "d" is E(V).

A state 3 (3-a) of FIG. 8C is the state that the plate-like member 107 is inclined in the first inclination direction toward the electrode "a" and the electrode "b" and is in the OFF state, the instruction as to the inclination direction of the plate-like member 107 in the state 1 indicates the ON state, and the potential of the electrode "e" is 0V and the potential of the electrode "f" is VH. The potential of the plate-like member 107 is 0V due to that the potential of the electrode "c" is –E(V) and the potential of the electrode "d" is E(V). The potential of the electrode "e" that is close to the plate-like member 107 is also 0V. The plate-like member 107 switches the inclination direction to the second inclination direction toward the electrode "c" and the electrode "d" to be in the ON state by the electrostatic force generated between the plate-like member 107 and the electrode "c" and the electrode "d" due to the potential difference between the plate-like member 107 and the electrode "c" and the electrode "d". Because the potentials of the whole electrodes on the inclined side of the plate-like member 107 become the same as the potential of the plate-like member 107, the electrostatic force is not generated between the plate-like member 107 and the electrodes on the inclined side of the plate-like member 107. Therefore, the plate-like member 107 is not prohibited from being inclined in the opposite inclination direction. The potential of the plate-like member 107 may be set not only to 0V but also to VH.

A state 3(3-b) of FIG. 8C is the state that the plate-like member 107 is inclined in the first inclination direction toward the electrode "a" and the electrode "b" and is in the OFF state, the instruction as to the inclination direction of the plate-like member 107 in the state 1 indicates the OFF state, and the potential of the electrode "e" is VH and the potential of the electrode "f" is 0V. The potential of the plate-like member 107 is 0V due to that the potential of the electrode "c" is –E(V) and the potential of the electrode "d" is E(V), and the plate-like member 107 is attracted by the electrostatic force toward the electrode "c" and the electrode "d". However, because the potential of the electrode "e" that is close to the plate-like member 107 is VH, a relatively large electrostatic force is generated between the plate-like member 107 and the electrode "e", so that the plate-like member 107 continues to be inclined in the first inclination direction toward the electrode "a" and the electrode "b".

A state 3(3-c) of FIG. 8C is the state that the plate-like member 107 is inclined in the second inclination direction toward the electrode "c" and the electrode "d" and is in the ON state, the instruction as to the inclination direction of the plate-like member 107 in the state 1 indicates the ON state, and the potential of the electrode "e" is 0V and the potential of the electrode "f" is VH. The potential of the plate-like member 107 is 0V due to that the potential of the electrode "c" is –E(V) and the potential of the electrode "d" is E(V), and the plate-like member 107 is attracted by the electrostatic force toward the electrode "c" and the electrode "d", so that the inclination direction of the plate-like member 107 is kept.

A state 3(3-d) of FIG. 8C is the state that the plate-like member 107 is inclined in the second inclination direction toward the electrode "c" and the electrode "d" and is in the ON state, and the potential of the electrode "e" is VH and the potential of the electrode "f" is 0V. The potential of the plate-like member 107 is 0V due to that the potential of the electrode "c" is –E(V) and the potential of the electrode "d" is E(V), and the plate-like member 107 is attracted by the electrostatic force toward the electrode "c" and the electrode "d". However, when the operation sequence is in the order of the state 2 and state 3, the inclination direction of the plate-like member 107 has been switched to the first inclination direction in the previous state 2(2-d), so that the state 3(3-d) does not occur.

The drive method of the optical deflecting device of the present invention can be expanded to the optical deflecting device array illustrated in FIG. 2 and can be used in a display system expressing gradation. In this case, the length of time of the ON or OFF state in the state 1 of the optical deflecting device is used for expressing gradation, however, the present invention is not limited to such a method of expressing gradation.

For example, the display period in the state 1 may be cut by half, such as one half of the longest display period, one-fourth of the longest display period, one-eighth of the longest display period, etc., and displaying may be performed by combining these display periods. When expressing 256 scales, 8 bit data is used. In this case, when expressing 3 colors with a single optical deflecting device using a color wheel, etc., the shortest display period is about 20 μsec.

In the above-described method for driving the optical deflecting device array, with respect to a plurality of pixels, displaying of the ON or OFF state is changed simultaneously in the state 2 or the state 3 by the data written in the state 1. The period of the state 2 and that of the state 3 can be about several microseconds, so that the transition to the ON or OFF state is sufficiently fast and cannot be recognized with eyes. Thus, because the plate-like member 107 does not change its inclination direction while data is being written, the time lag does not occur in pixels in the ON or OFF state. Further, the shortest display period is not influenced.

Figure 9:
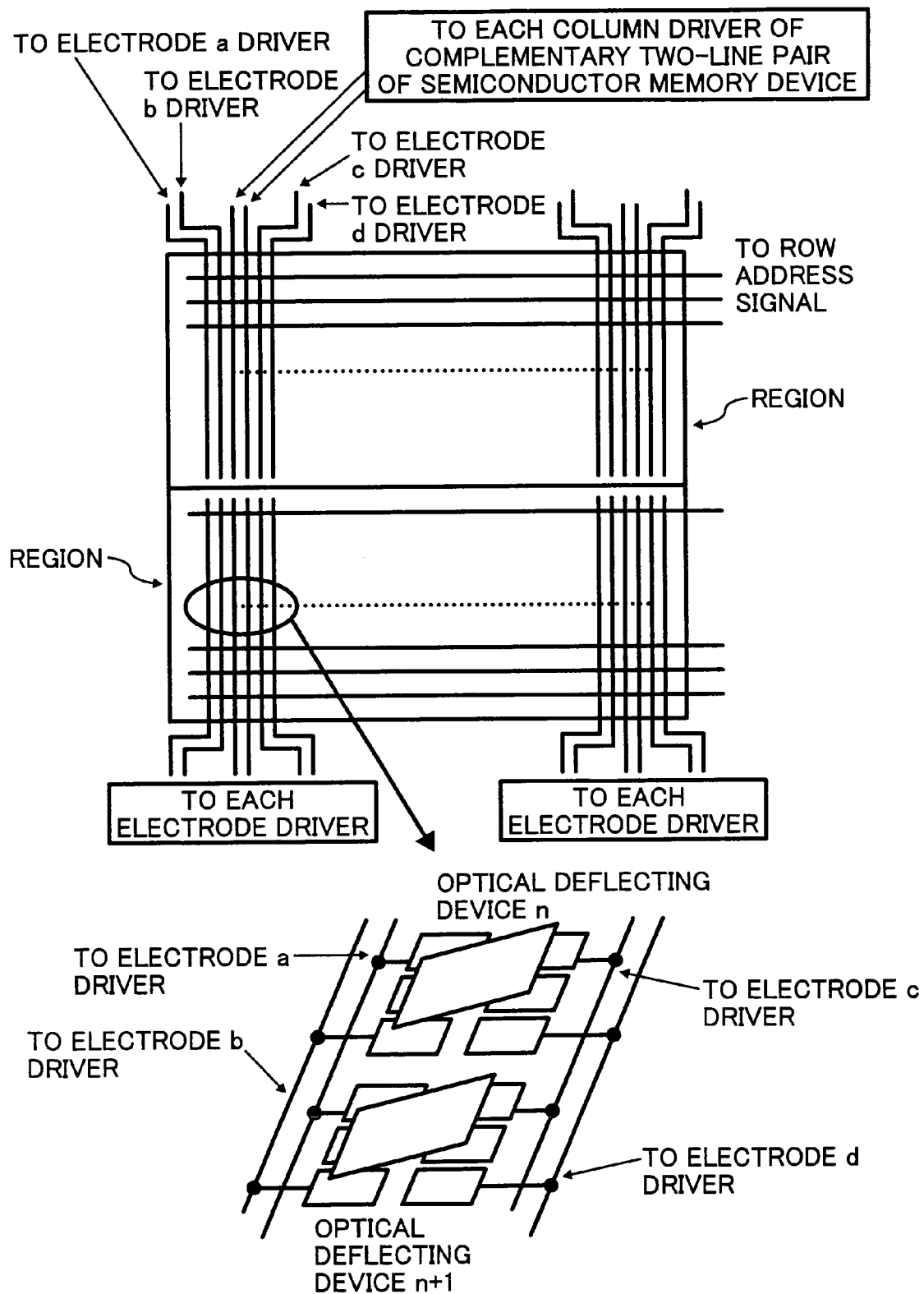
FIG. 9 is a diagram illustrating connection of the drive electrodes of respective optical deflecting devices of the optical deflecting device array illustrated in FIG. 2.
Figure 10A:
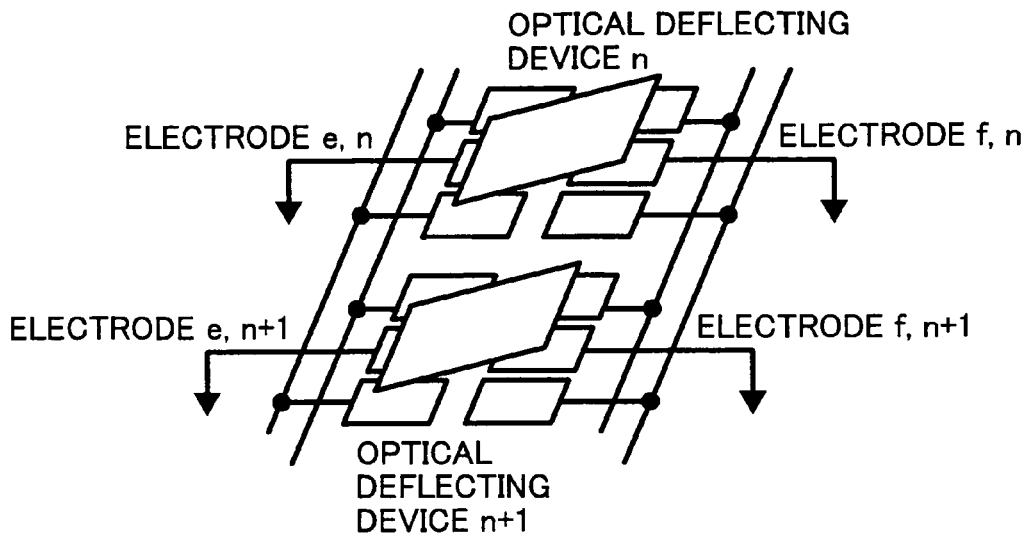
FIG. 10A and FIG. 10B are diagrams illustrating connection of the control electrodes of respective optical deflecting devices of the optical deflecting device array illustrated in FIG. 2.
Figure 10B:
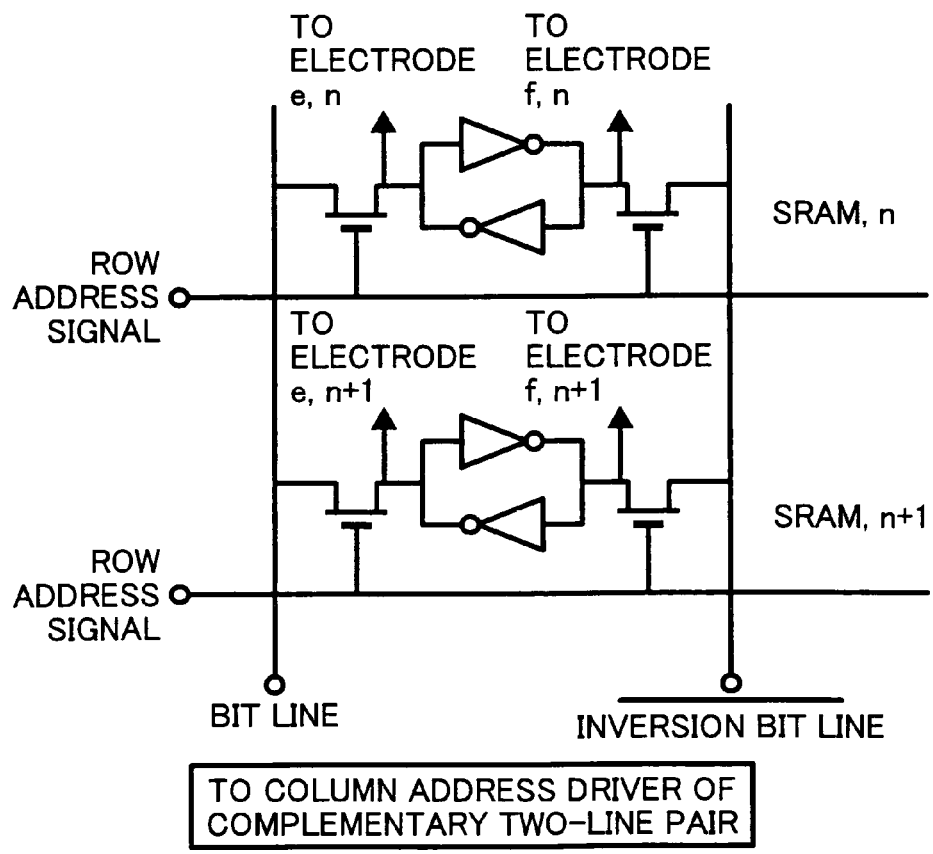

FIG. 9, FIG. 10A and FIG. 10B illustrate connection of the electrodes "a", "b", "c", "d", "e" and "d" in the optical deflecting device array in which a plurality of the optical deflecting devices is arranged in a two-dimensional array (FIG. 2).

FIG. 9 illustrates connection of the drive electrodes (i.e., the electrode "a", the electrode "b", the electrode "c" and the electrode "d") of each optical deflecting device in the optical deflecting device array. As illustrated in FIG. 9, in an area of the optical deflecting device array, respective drive electrodes of each optical deflecting device are wired with corresponding drive electrodes of other optical deflecting devices. For example, the electrode "a" of an optical deflecting device "n" is wired with the electrode "a" of an optical deflecting device "n+1", the electrode "b" of the optical deflecting device "n" is wired with the electrode "b" of the optical deflecting device "n+1", the electrode "c" of the optical deflecting device "n" is wired with the electrode "c" of the optical deflecting device "n+1", and the electrode "d" of the optical deflecting device "n" is wired with the electrode "d" of the optical deflecting device "n+1", and drive voltages for respective corresponding electrodes are changed according to the state (the state 1, the state 2, and the state 3) at the same time with corresponding electrode drivers. In FIG. 9, for convenience, the connection of the electrodes is illustrated only with respect to an optical deflecting device "n" and an optical deflecting device "n+1".

FIG. 10A and FIG. 10B illustrate connection of the control electrodes (i.e., the electrode "e" and the electrode "f") of each optical deflecting device with a semiconductor memory (e.g., a SRAM) in the optical deflecting device array. The electrode "e" and the electrode "f" of the optical deflecting device "n" and the electrode "e" and the electrode "f" of the optical deflecting device "n+1" (illustrated in FIG. 10A) are connected with complimentary output lines of a semiconductor memory "n" and complimentary output lines of a semiconductor memory "n+1" (illustrated in FIG. 10B), respectively.

With the connections illustrated in FIG. 9, FIG. 10A and FIG. 10B, the number of electric sources with high voltage may be suppressed, for example, to 4 or several. In the case of an electric source changing voltage among 20V, 0V and −20V, the minimum number of the electric sources required is 4. Complimentary outputs of a corresponding semiconductor memory, such as, 0V and 5V or 0V and 3.3V, are given to each optical deflecting device. When dividing the optical deflecting device array into a plurality of areas, 4 electric sources for drive electrodes are necessary for each area. For example, if the optical deflecting device array is divided into two areas, 8 electric sources are necessary.

Figure 11:
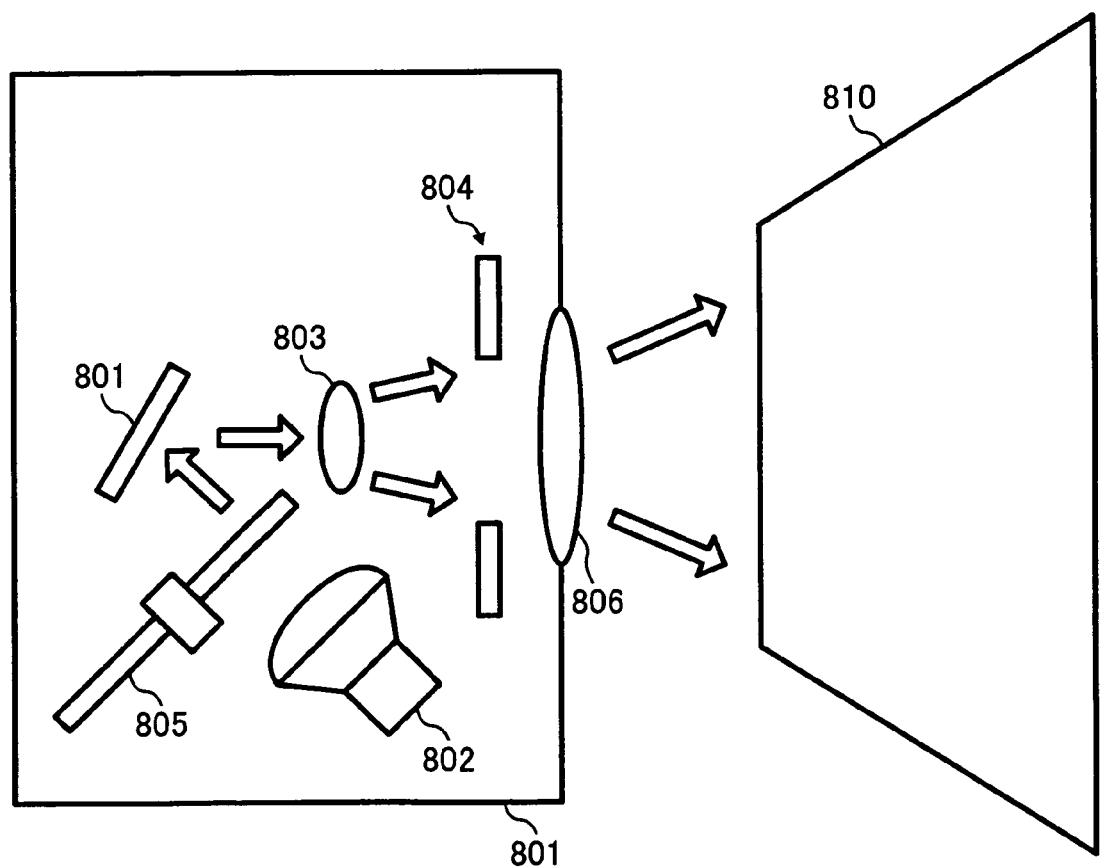
FIG. 11 is a diagram illustrating an exemplary structure of an image projection display apparatus using the optical deflecting device of the present invention.

FIG. 11 illustrates an exemplary structure of an image projection display apparatus using the optical deflecting device and its drive method of the present invention. A light having a certain diverging angle from a light source 802 is illuminated onto an optical deflecting device 801 of the present invention via a rotating color filter 805, and a reflected light from a light reflective area of a plate-like member of the optical deflecting device 801 is illuminated onto a projection screen 810 via a projection lens 806 in the first inclination direction of the plate-like member, which is the ON state. However, in the second inclination direction of the plate-like member, the reflected light impinges upon a light shielding member 804 as a diaphragm and is not illuminated onto the projection screen 810, which is the OFF state. By arranging a plurality of the optical deflecting devices 801 in a two-dimensional array, an image can be formed on the projection screen 810 by the ON or OFF state of each of the plurality of the optical deflecting devices 801. Thus, the optical deflecting device 801 can be used as a light switch device of a display apparatus displaying image projection data (i.e., displaying light and shade of a pixel). Accordingly, the control of light and shade of a pixel (i.e., the ON/OFF control of light switching) is excellent, the stray light (the reflected light from a neighboring element generated when the reflection direction has been disturbed) can be suppressed, the high-speed operation is possible, the long-term reliability is high, driving with a low voltage is possible, and the contrast ratio can be enhanced.

Numerous additional modifications and variations of the present invention are possible in light of the above-teachings. It is therefore to be understood that within the scope of the claims, the present invention can be practiced otherwise than as specifically described herein.

What is claimed is:

1. An optical deflecting device comprising:
a plate member including a light reflective area and a conductor layer, the plate member rotating with substantially the middle portion thereof made a fulcrum to change an inclination direction thereof and thereby a reflection direction of a light flux incident to the light reflective area being changed; and
a first electrode group and a second electrode group arranged so as to oppose the conductor layer of the plate member, respectively, and to sandwich a position corresponding to a position of the fulcrum of the plate member, each electrode group including a control electrode controlling starting of the plate member and a drive electrode driving the plate member,
wherein the control electrodes of the first electrode group and the second electrode group are connected with complementary outputs of a semiconductor memory, respectively.

2. An optical deflecting device comprising:
a plate member including a light reflective area and a conductor layer, the plate member rotating with substantially the middle portion thereof made a fulcrum to change an inclination direction thereof and thereby a reflection direction of a light flux incident to the light reflective area being changed; and
a first electrode group and a second electrode group arranged so as to oppose the conductor layer of the plate member, respectively, and to sandwich a position corresponding to a position of the fulcrum of the plate member, each electrode group including a control electrode controlling starting of the plate member and a drive electrode driving the plate member,
wherein the control electrodes of the first electrode group and the second electrode group are respectively arranged in positions opposing corners of the plate member.

3. An optical deflecting device comprising:
a plate member including a light reflective area and a conductor layer, the plate member rotating with substantially the middle portion thereof made a fulcrum to change an inclination direction thereof and thereby a reflection direction of a light flux incident to the light reflective area being changed; and
a first electrode group and a second electrode group arranged so as to oppose the conductor layer of the plate member, respectively, and to sandwich a position corresponding to a position of the fulcrum of the plate member, each electrode group including a control electrode controlling starting of the plate member and a drive electrode driving the plate member,
wherein each of the first electrode group and the second electrode group is consisted of three electrodes, an electrode at the center being the control electrode and an electrode on each side of the control electrode being the drive electrode.

4. A method for driving an optical deflecting device, the optical deflecting device including a plate member having a light reflective area and a conductor layer, the plate member rotating with substantially the middle portion thereof made a fulcrum to change an inclination direction thereof and thereby a reflection direction of a light flux incident to the light reflective area being changed, and a first electrode group and a second electrode group arranged so as to oppose the conductor layer of the plate member, respectively, and to sandwich a position corresponding to a position of the fulcrum of the plate member, each electrode group including a control electrode controlling starting of the plate member and a drive electrode driving the plate member, the method comprising:

applying complementary outputs of a semiconductor memory to the control electrodes of the first electrode group and the second electrode group, respectively; and applying potentials to the drive electrodes of the first electrode group or the second electrode group to induce a potential in the plate member, wherein the potential induced in the plate member by the drive electrodes of the first electrode group or the second electrode group is about a low or high potential of an operation voltage of the semiconductor memory.

5. The method according to claim 4, wherein apotential of each drive electrode of the first electrode group or the second electrode group onthe inclined side of the plate member and a potential of the control electrode of the first electrode group or the second electrode group on the inclined side of the plate member is substantially the same.

6. An optical deflecting device array comprising:

a plurality of optical deflecting devices two-dimensionally arranged, each optical deflecting device including a plate member having a light reflective area and a conductor layer, the plate member rotating with substantially the middle portion thereof made a fulcrum to change an inclination direction thereof and thereby a reflection direction of a light flux incident to the light reflective area being changed, and a first electrode group and a second electrode group arranged so as to oppose the conductor layer of the plate member, respectively, and to sandwich a position corresponding to a position of the fulcrum of the plate member, each electrode group including a control electrode controlling starting of the plate member and a drive electrode driving the plate member; and a plurality of semiconductor memones arranged to correspond to the plurality of optical deflecting devices, wherein the drive electrodes of the first electrode group and the second electrode groups, other than the control electrodes, of respective optical deflecting devices, that are located in corresponding positions, respectively, are connected with each other, and the control electrodes of each optical deflecting device are connected with complementary outputs of a corresponding semiconductor memory of the plurality of semiconductors memories.

* * * * *